United States Patent
Beck

(10) Patent No.: US 9,810,299 B2
(45) Date of Patent: Nov. 7, 2017

(54) MULTI-STAGE POWER-SHIFT TRANSMISSION

(71) Applicant: ZF Friedrichshafen AG, Friedrichshafen (DE)

(72) Inventor: Stefan Beck, Eriskirch (DE)

(73) Assignee: Friedrichshafen AG, Friedrichshafen (DE)

( * ) Notice: Subject to any disclaimer, the term of this patent is extended or adjusted under 35 U.S.C. 154(b) by 326 days.

(21) Appl. No.: 14/396,090

(22) PCT Filed: Mar. 13, 2013

(86) PCT No.: PCT/EP2013/055065
§ 371 (c)(1),
(2) Date: Oct. 22, 2014

(87) PCT Pub. No.: WO2013/159995
PCT Pub. Date: Oct. 31, 2013

(65) Prior Publication Data
US 2015/0087469 A1    Mar. 26, 2015

(30) Foreign Application Priority Data
Apr. 27, 2012  (DE) .......... 10 2012 207 028

(51) Int. Cl.
F16H 3/66    (2006.01)
F16H 37/04    (2006.01)
(Continued)

(52) U.S. Cl.
CPC ............. F16H 37/042 (2013.01); B60K 6/48 (2013.01); F16H 3/66 (2013.01);
(Continued)

(58) Field of Classification Search
None
See application file for complete search history.

(56) References Cited

U.S. PATENT DOCUMENTS 5,358,458 A    10/1994   Hicks
6,984,187 B2    1/2006   Biermann
(Continued)

FOREIGN PATENT DOCUMENTS

DE    2 065 400    8/1973
DE    691 06 861 T2    6/1995
(Continued)

OTHER PUBLICATIONS

German Search Report Corresponding to 10 2012 207 028.1 dated Mar. 28, 2014.
(Continued)

*Primary Examiner* — Edwin A Young
(74) *Attorney, Agent, or Firm* — Davis & Bujold PLLC; Michael J. Bujold

(57) ABSTRACT

A power shiftable multi-stage transmission of a planetary design and disposed between an input drive shaft and an output shaft for a vehicle. The multi-stage transmission has two parallel shaft trains, six shift elements, at least two spur gear stages and three planetary gear sets. Each of the planetary gear sets has a sun gear, a ring gear and a planet carrier combined in a carrier having multiple planetary gears. The two shaft trains may be connected to one another via the at least two spur gear stages. Different transmission ratios, between the input drive shaft and the output shaft, may be achieved by selective engagement of the six shift elements such that a plurality of forward gears, at least nine forward gears, and at least one reverse gear, may be implemented.

18 Claims, 14 Drawing Sheets

(51) Int. Cl.
*B60K 6/48* (2007.10)
*F16H 3/44* (2006.01)

(52) U.S. Cl.
CPC .......... *F16H 2003/445* (2013.01); *F16H 2200/0008* (2013.01); *F16H 2200/0065* (2013.01); *F16H 2200/0082* (2013.01); *F16H 2200/201* (2013.01); *F16H 2200/2046* (2013.01); *Y02T 10/6221* (2013.01)

(56) References Cited

U.S. PATENT DOCUMENTS

| | | | |
|---|---|---|---|
| 7,819,772 | B2 | 10/2010 | Tenberge |
| 8,388,488 | B2 | 3/2013 | Phillips et al. |
| 8,721,488 | B2 * | 5/2014 | Mellet .............. F16H 3/725 475/276 |
| 2006/0142111 | A1 | 6/2006 | Park |
| 2009/0036252 | A1 | 2/2009 | Phillips et al. |
| 2010/0035718 | A1 | 2/2010 | Saitoh |
| 2012/0053003 | A1 | 3/2012 | Hwang |
| 2012/0088627 | A1 | 4/2012 | Phillips |
| 2012/0094799 | A1 | 4/2012 | Phillips |

FOREIGN PATENT DOCUMENTS

| | | |
|---|---|---|
| DE | 101 15 985 A1 | 10/2002 |
| DE | 10 2005 018 804 A1 | 7/2006 |
| DE | 10 2010 019 649 A1 | 1/2011 |
| DE | 10 2009 018 958 A1 | 2/2011 |
| DE | 10 2011 080 566 A1 | 2/2013 |

OTHER PUBLICATIONS

German Search Report Corresponding to 10 2012 207 099.0 dated Jul. 10, 2014.
International Search Report Corresponding to PCT/EP2013/055065 dated Jun. 26, 2013.
International Search Report Corresponding to PCT/EP2013/055063 dated Jul. 23, 2013.
Written Opinion Corresponding to PCT/EP2013/055065 dated Jun. 26, 2013.

* cited by examiner

| GEAR | ENGAGED SHIFT ELEMENTS ||||||  RATIO | GEAR INCREMENT |
| --- | --- | --- | --- | --- | --- | --- | --- | --- |
|  | BRAKE || CLUTCH ||||  |  |
|  | B1 | B2 | K1 | K2 | K3 | K4 | i | φ |
| 1 | × |  |  | × |  | × | 5.531 | 1.713 |
| 2 |  |  |  | × | × | × | 3.228 | 1.446 |
| 3 | × |  |  |  | × | × | 2.232 | 1.379 |
| 4 |  |  | × |  | × | × | 1.619 | 1.341 |
| 5 | × |  | × |  | × |  | 1.207 | 1.207 |
| 6 |  |  | × | × | × |  | 1.000 | 1.160 |
| 7 | × |  | × | × |  |  | 0.862 | 1.194 |
| 8 |  | × | × | × |  |  | 0.722 | 1.174 |
| 9 | × | × | × |  |  |  | 0.815 | 8.993 |
| R | × | × |  |  |  | × | -5.165 | -0.934 |
| M4' |  | × | × |  |  | × | 1.619 ||
| M4" |  |  | × | × |  | × | 1.619 ||
| M4'" | × |  | × |  |  | × | 1.619 ||

Fig. 3

MULTI-STAGE POWER-SHIFT TRANSMISSION

This application is a National Stage completion of PCT/EP2013/055065 filed Mar. 13, 2013, which claims priority from German patent application serial no. 10 2012 207 028.1 filed Apr. 27, 2012.

FIELD OF THE INVENTION

The present invention relates to a power shiftable multi-stage transmission in planetary design for a vehicle, which may be used, for example, as an automatic transmission.

BACKGROUND OF THE INVENTION

Power shiftable multi-stage transmissions are used as drive gearboxes in drive trains of vehicles. Such multi-stage transmissions have multiple transmission stages and multiple shift elements. They are found in embodiments for passenger vehicles having up to eight forward gears for frontal transverse installation or for longitudinal installation. There are power shiftable multi-stage transmissions with spur-gear stages and with planetary gear stages for producing transmission ratios. Power shiftable multi-stage transmissions having planetary gear stages are in most cases automatic transmissions, which are shifted by means of friction elements or, respectively, shift elements, such as clutches and brakes. Normally, such multi-stage transmissions are connected to a start-up element, such as a hydrodynamic torque converter or a hydraulic clutch. Such a start-up element is subject to a slip effect and is optionally provided with a bypass clutch. The known transmission concepts have specific advantages and specific disadvantages, such that they are of interest only for certain applications.

Patent specification U.S. Pat. No. 7,819,772 B2 discloses a power shiftable multi-stage transmission between an input drive shaft and an output shaft. The multi-stage transmission has multiple transmission stages and multiple shift elements.

SUMMARY OF THE INVENTION

Against this background, the present invention provides an improved power shiftable multi-stage transmission in planetary design for a vehicle according to the following description.

A power shiftable multi-stage transmission in planetary design, in particular, an automatic transmission for a vehicle, has an input drive shaft and an output shaft, six shift elements, at least two spur gear stages and three planetary gear sets, each including a sun gear, a ring gear and a planet carrier with multiple planetary gears, the planet carrier being combined into one carrier. The two shaft trains may be connected to one another via the at least two spur gear stages. Different transmission ratios between the input shaft and the output shaft may be achieved by selective engagement of the six shift elements. In this way, it is possible to implement a plurality of forward gears, in particular, at least nine forward gears and at least one reverse gear.

The vehicle may be a motor vehicle, for example, a passenger vehicle, a truck or some other commercial vehicle. The vehicle may be equipped with an internal combustion engine and simultaneously or alternatively with an electric drive, i.e. implemented also as a hybrid vehicle. The subdivision of the coupled planetary gear stages into just two shaft trains results in a short overall length, but also in an overall compact assembly.

Depending on the embodiment, a shift element may be understood to mean a clutch or a brake. A shift element may be implemented both as a friction-locking as well as a form-locking shift element. An employed shift element may be designed as a power shifting clutch or a power shifting brake. In particular, a shift element may be implemented as a force-locking clutch or as a force-locking brake, such as a lamellar clutch, a band brake or a cone clutch. Furthermore, a shift element may be implemented as a form-locking brake or a form-locking clutch, such as a synchronization or a claw clutch. Shift elements of various types may be used for the six shift elements of the multi-stage transmission.

The spur gear stages and planetary gear sets may be based on known arrangements. For example, the multi-stage transmission may comprise precisely two spur gear stages, i.e. not more than two spur gear stages or precisely three spur gear stages, i.e. not more than three spur gear stages. With regard to planetary gear sets, the multi-stage transmission may comprise precisely three planetary gear sets, for example, i.e. not more than three planetary gear sets.

For front wheel-drive vehicles, an arrangement of the transmission in the forward part of the vehicle and an orientation of the main transmission alignment transverse to the vehicle main axis and thus, in particular, a parallel arrangement of the two shaft trains is advantageous. Thus, the input drive shaft and the output shaft may be disposed parallel to one another. The multi-stage transmission advantageously has a short axial design, which is ideal for the front transverse design. The multi-stage transmission is also characterized by minimum production effort, low costs and light weight, as well as a good transmission ratio range, low absolute rotational speeds, low relative rotational speeds, low planetary set torques and low shift element torques, good gearing efficiency and a compact design.

The multi-stage transmission according to one embodiment is a 9-speed planetary power shift transmission. The multi-stage transmission may also be useful as a front transverse system by appropriately arranging the gear sets and the shift elements. The multi-stage transmission may comprise at least nine forward gears. In this arrangement, the multi-stage transmission may be implemented with three planetary gear sets.

The power shiftable multi-stage transmission in planet design may therefore have at least nine forward gears and one reverse gear and, for motor vehicles, may have a well-adapted transmission ratio having a high overall gear ratio, as well as favorable step changes. The transmission may allow for a high start-up transmission ratio in the forward direction and may have a direct gear. In such case, the multi-stage transmission requires only minimal production effort and is characterized, in particular, by a small number of shift elements and, in the event of sequential shifting, avoids double shifting. In this way, when shifting in defined gear groups, only one previously engaged shift element is disengaged and one previously disengaged shift element is engaged.

In terms of the multi-stage transmission, there are two basic arrangements that may be implemented, which are referred to hereinafter as first and third main system. In addition, a second main system may be derived from the first main system by a modified arrangement of two planetary gear sets on the first shaft train. In the first and second main system, the planetary gear sets are disposed on the first shaft train. In the third main system, two of the three planetary gear sets are disposed on the first shaft train and one of the three planetary gear sets is disposed on the second shaft train, an additional spur gear stage being required as compared to the first main system.

For the three main systems, it is also possible to implement different arrangement variants. For this purpose, shift elements may be disposed in a power path of the transmission as operatively equivalent at different locations in the power path. In particular, there are various options for coupling the shift elements, referred to hereinafter as first, third and fourth shift element, to the different shafts of the multi-step transmission. Thus, an entire family of transmissions may be implemented.

Described below are embodiments of the first main system.

In these embodiments, the three planetary gear sets and the input drive shaft may be disposed on a first shaft train of the two parallel shaft trains. The output shaft may be disposed on a second shaft train of the two parallel shaft trains. The two parallel shaft trains may be connected to one another via the two spur gear stages. A sun gear of a second planetary gear set of the three planetary gear sets and the input drive shaft may be torsion-resistantly connected to one another and form a first connecting element. A sun gear of a first planetary gear set of the three planetary gear sets, a spur gear of a first spur gear stage of the at least two spur gear stages and a ring gear of the third planetary gear set of the three planetary gear sets may be connected to one another via a second, third and fourth connecting element, wherein the second, the third and the fourth connecting element may have a shared connection point, and the second connecting element may also be connected to the sun gear of the first planetary gear set, the third connecting element may also be connected to the first spur gear of the first spur gear stage, and the fourth connecting element may also be connected to the ring gear of the third planetary gear set. A first spur gear of a second spur gear stage of the at least two spur gear stages and a ring gear of the first planetary gear set may be connected to one another and form a fifth connecting element. A second spur gear of the second spur gear stage and the output shaft may be connected to one another and form a sixth connecting element. A carrier of the first planetary gear set and the input drive shaft may be connected to one another and form a seventh connecting element. A second spur gear of the first spur gear stage and the output shaft may be connected to one another and form an eighth connecting element. A ring gear of the second planetary gear set and a carrier of the third planetary gear set may be connected to one another and form a ninth connecting element. A second shift element of the six shift elements may be disposed in the flow of power between the fourth connecting element and a carrier of the second planetary gear set. A fifth shift element of the six shift elements may be disposed in the flow of power between the sun gear of the third planetary gear set and a transmission housing. A sixth shift element of the six shift elements may be disposed in the flow of power between the carrier of the second planetary gear set and the transmission housing.

In the flow of power may be understood to mean that power may be transferred via the respective shift element when the respective shift element is engaged. If, on the other hand, the shift element is disengaged, then no force may be transferred via the respective shift element, the flow of power may therefore be disrupted.

A connecting element may be understood to mean a shaft. A connecting element, depending on the embodiment, may be understood to mean either a rigid element or else an element composed of sub-elements coupled by a clutch. Thus, two elements connected by means of a connecting element may be torsion-resistantly connected to one another and form, for example, a rigid shaft. Alternatively, a connecting element may have a clutch. In principle, a free wheel to the housing or to any other shaft may be disposed on each shaft of the multi-stage transmission.

In the first main system depicted, several of the shift elements may be disposed at other points of the power path without causing a change in the transmission ratios or in a shift pattern. Thus, in various arrangement variants, power paths in the transmission may be connected or separated at various locations via clutches, in this case the first and the fourth shift element, wherein this may occur in an operatively equivalent manner at various locations in a power path. This results in the following alternative embodiments for the first main system described below.

In one embodiment of the first main system, the seventh connecting element may have a first shift element of the six shift elements. In this arrangement, the first shift element may be disposed in the flow of power between the input drive shaft and the carrier of the first planetary gear set.

In another embodiment of the first main system, the second connecting element may have the first shift element. In this arrangement, the first shift element may be disposed in the flow of power between the sun gear of the first planetary gear set and the third and/or fourth connecting element. In this embodiment, the first shift element may be disposed in the flow of power between the sun gear of the first planetary gear set and the first spur gear of the first spur gear stage and the ring gear of the third planetary gear set.

In another embodiment of the first main system, the fifth connecting element may have the first shift element. In this arrangement, the first shift element may be disposed in the flow of power between a ring gear of the first planetary gear set and a first spur gear of the second spur gear stage.

In another embodiment of the first main system, the sixth connecting element may have the first shift element. In this arrangement, the first shift element may be disposed in the flow of power between a second spur gear of the first spur gear stage and the output shaft.

In one embodiment, in the first main system, the third shift element of the six shift elements may be disposed in the flow of power between the input drive shaft and the carrier of the second planetary gear set. In one embodiment, in the second main system, the third shift element of the six shift elements may be disposed in the flow of power between the carrier of the second planetary gear set and the ninth connecting element. Both arrangement variants of the third shift element may be combined with the described arrangement variants of the first shift element and with the arrangement variants of the fourth shift element described below.

Described below are embodiments of the third main system.

In the third main system, unlike the first and/or second main system depicted, one of the planetary gear sets may be disposed on the second shaft train. In this arrangement, the planetary gear set disposed on the second shaft train may be coupled in at least two ways to the spur gear stages, while the level of the stationary gear ratios and level of the transmission ratios of the main system remain the same.

According to the third main system, two planetary gear sets and the input drive shaft may be disposed on a first shaft train of the two parallel shaft trains. A first planetary gear set of the three planetary gear sets and the output shaft may be disposed on a second shaft train of the two parallel shaft trains. The two parallel shaft trains may be connected to one another via three spur gear stages. A sun gear of a second planetary gear set of the three planetary gear sets and the input drive shaft may be torsion-resistantly connected to one another and form a first connecting element. A ring gear of the third planetary gear set, a first spur gear of a third spur gear stage and a first spur gear of a first spur gear stage of the at least two spur gear stages may be connected via a third, fourth and tenth connecting elements, wherein the third, fourth and tenth connecting elements may have a shared connection point. The third connecting element may also be connected to the first spur gear of the first spur gear stage. The fourth connecting element may also be connected to the ring gear of the third planetary gear set. The tenth connecting element may also be connected to the first spur gear of the third spur gear stage. A second spur gear of the first spur gear stage and the output shaft may be connected and form an eighth connecting element. A ring gear of a second planetary gear set of the three planetary gear sets and the carrier of the third planetary gear set may be torsion-resistantly connected to one another and form a ninth connecting element. The output shaft and the ring gear of a first planetary gear set may be connected and form an eleventh connecting element. A carrier of the first planetary gear set and a second spur gear of the fourth spur gear stage may be connected and form a twelfth connecting element. A sun gear of the first planetary gear set and a second spur gear of the third spur gear stage may be connected and form a thirteenth connecting element. A first spur gear of a fourth spur gear stage of the at least two spur gear stages and the input drive shaft may be connected to one another and form a fourteenth connecting element. The fourth connecting element and the carrier of the second planetary gear set may be connected by means of a second shift element of the six shift elements. The carrier of the second planetary gear set may be connected to the sun gear of the second planetary gear set and the input drive shaft by means of a third shift element of the six shift elements. A fifth shift element of the six shift elements may be disposed in the flow of power between the sun gear of the third planetary gear set and the transmission housing. A sixth shift element of the six shift elements may be disposed in the flow of power between the carrier of the third planetary gear set and the transmission housing.

Similar to the representation of the first main system, operatively equivalent, alternative embodiment variants for the third main system also by relocating the shift elements on a power path. Thus, the first shift element may be positioned as an operative equivalent at at least five locations and the fourth shift element may be positioned as an operative equivalent at two locations.

Thus, according to one embodiment of the third main system, the fourteenth connecting element may have a first shift element of the six shift elements. In this arrangement, the first shift element is disposed in the flow of power between the input drive shaft and the first spur gear of the fourth spur gear stage.

Further, according to another embodiment of the second main system, the twelfth connecting element may have a first shift element of the six shift elements.

Further, according to another embodiment of the second main system, the eleventh connecting element may have a first shift element of the six shift elements.

Further, according to another embodiment of the second main system, the tenth connecting element may have a first shift element of the six shift elements.

Further, according to another embodiment of the second main system, the thirteenth connecting element may have a first shift element.

Further, according to other embodiments of the three main systems, the eighth connecting element may have a fourth shift element of the six shift elements. In this arrangement, the fourth shift element may be disposed in the flow of power between the second spur gear of the first spur gear stage and the output shaft.

Further, according to other embodiments of the three main systems, the third connecting element may have a fourth shift element of the six shift elements. In this arrangement, the fourth shift element may be disposed in the flow of power between the shared connection point of the third, fourth and tenth connecting elements and the first spur gear of the first spur gear stage.

The hybridization of vehicles is becoming increasingly important.

According to one embodiment, a power source may be disposed on the input drive shaft. The power source may be a motor, for example, an electric motor. The power source may be disposed axially parallel to the input drive shaft. In another embodiment, the power source may be disposed directly on the input drive shaft.

A further advantage of the multi-stage transmission presented herein is that an electric machine in the form of a generator and/or an additional drive machine may also be mounted on each shaft. As previously described, an electric machine or other power source may in principle be mounted on any shaft, also referred to here as connecting element. Particularly for the electric machine, however, a linkage to the input drive shaft seems advisable. It may be connected to the input drive shaft either directly or axially parallel via a gear pair. These variants are possible for all of the concepts described.

According to the embodiments, all three planetary gear sets are implemented, for example, as so-called minus planetary gear sets, the respective ring gear of which, in the case of an immobilized carrier, rotates in a direction opposite the sun gear.

In one embodiment of the present invention, at least one planetary gear set may be implemented as a so-called plus planetary gear set when the carrier and ring gear connection of the particular planetary gear set described is switched and the stationary gear ratio is adapted. A plus planetary gear set refers to a planetary transmission, the ring gear of which rotates in the same direction of rotation as the sun gear when the carrier is immobilized. A minus planetary gear set has planetary gears rotatably mounted on a planet carrier, which mesh with the sun gear and ring gear of this planetary gear set such that, when the planetary carrier is immobilized and the sun gear rotates, the ring gear rotates in a direction of rotation opposite the rotational direction of the sun gear. A plus planetary gear set has inner and outer planetary gears rotatably mounted on a planet carrier and in tooth engagement with one another, wherein the sun gear of this planetary gear set meshes with the aforementioned inner planetary gears and the ring gear of this planetary gear set meshes with the aforementioned outer planetary gears in such a way that when the planet carrier is immobilized and the sun gear rotates, the ring gear rotates in the same direction of rotation as the sun gear.

The general rule for the different embodiments is that connectability permitting, individual or multiple minus planetary gear sets may be converted to plus planetary gear sets if, at the same time, the carrier and ring gear connections are switched, and the level of the stationary gear ratio is increased by one.

According to one embodiment, the first forward gear of the multi-stage transmission may result by engaging the second, fourth and fifth shift element. The second forward gear may result by engaging the second, third and fourth shift element. The third forward gear may result by engaging the second, fourth and fifth shift element. The fourth forward gear may result by engaging the first, third and fourth shift element. The fifth forward gear may result by engaging the first, third and fifth shift element. The sixth forward gear may result by engaging the first, second and third shift element. The seventh forward gear may result by engaging the first, second and fifth shift element. The eighth forward gear may result by engaging the first, second and sixth shift element. The ninth forward gear may result by engaging the first, fifth and sixth shift element. The reverse gear may result by engaging the fourth, fifth and sixth shift element.

The transmission described may consist of the first shaft train on the input drive shaft side and the second shaft train on the output shaft side. These two shaft trains may be connected by at least two power paths, of which the at least two spur gear stages may be a part. When the power paths are separated by clutches, this may occur equally at any location within the power path. When such paths are connectable by brakes to the transmission housing, then this brake may also equally engage at other locations of the power path. Identical stationary gear ratios may be produced by different planetary transmission structures, which are to be considered equivalent within the meaning of this invention.

BRIEF DESCRIPTION OF THE DRAWINGS

The invention is explained in greater detail by way of example with reference to the appended drawings, in which:

FIG. 3 shows an exemplary shift pattern of a multi-stage transmission according to one exemplary embodiment of the present invention;

DETAILED DESCRIPTION OF THE PREFERRED EMBODIMENTS

Figure 1:
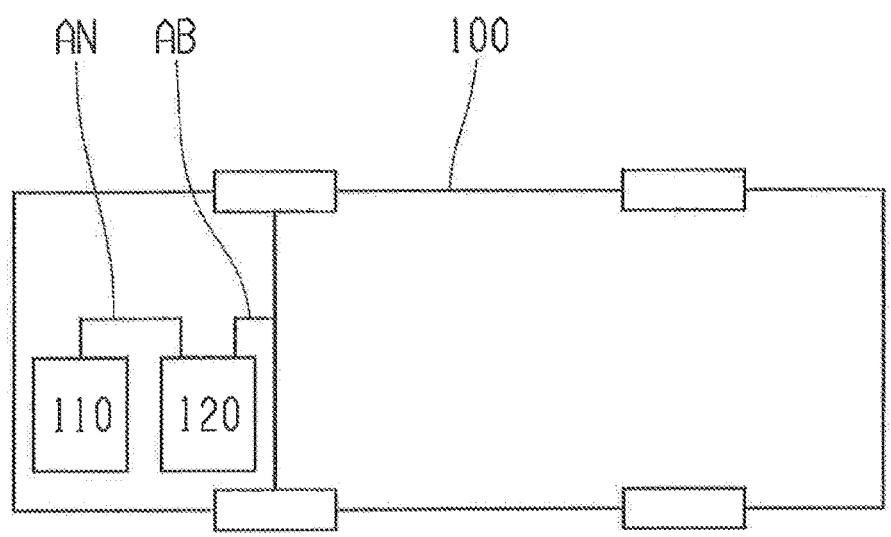
FIG. 1 shows a schematic representation of a vehicle having a power shiftable multi-stage transmission according to one exemplary embodiment of the present invention.

In the following description of preferred exemplary embodiments of the present invention, identical or similar reference numerals are used for elements which are similarly operating elements and represented in the various figures, whereby a repeated description of these elements is omitted.

Figure 6:
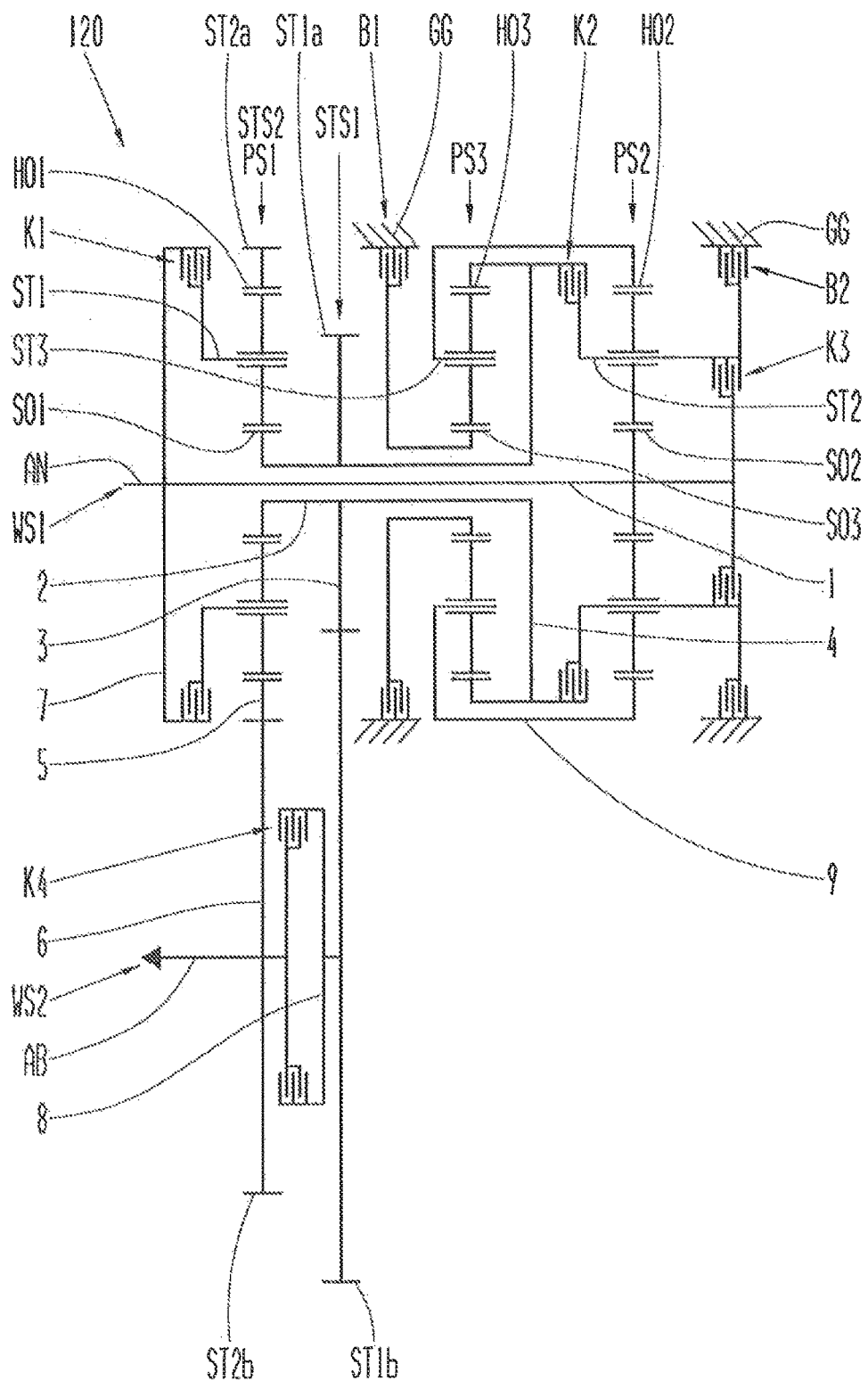
FIG. 6 shows a representation of a second main system according to one exemplary embodiment of the present invention.
Figure 7:
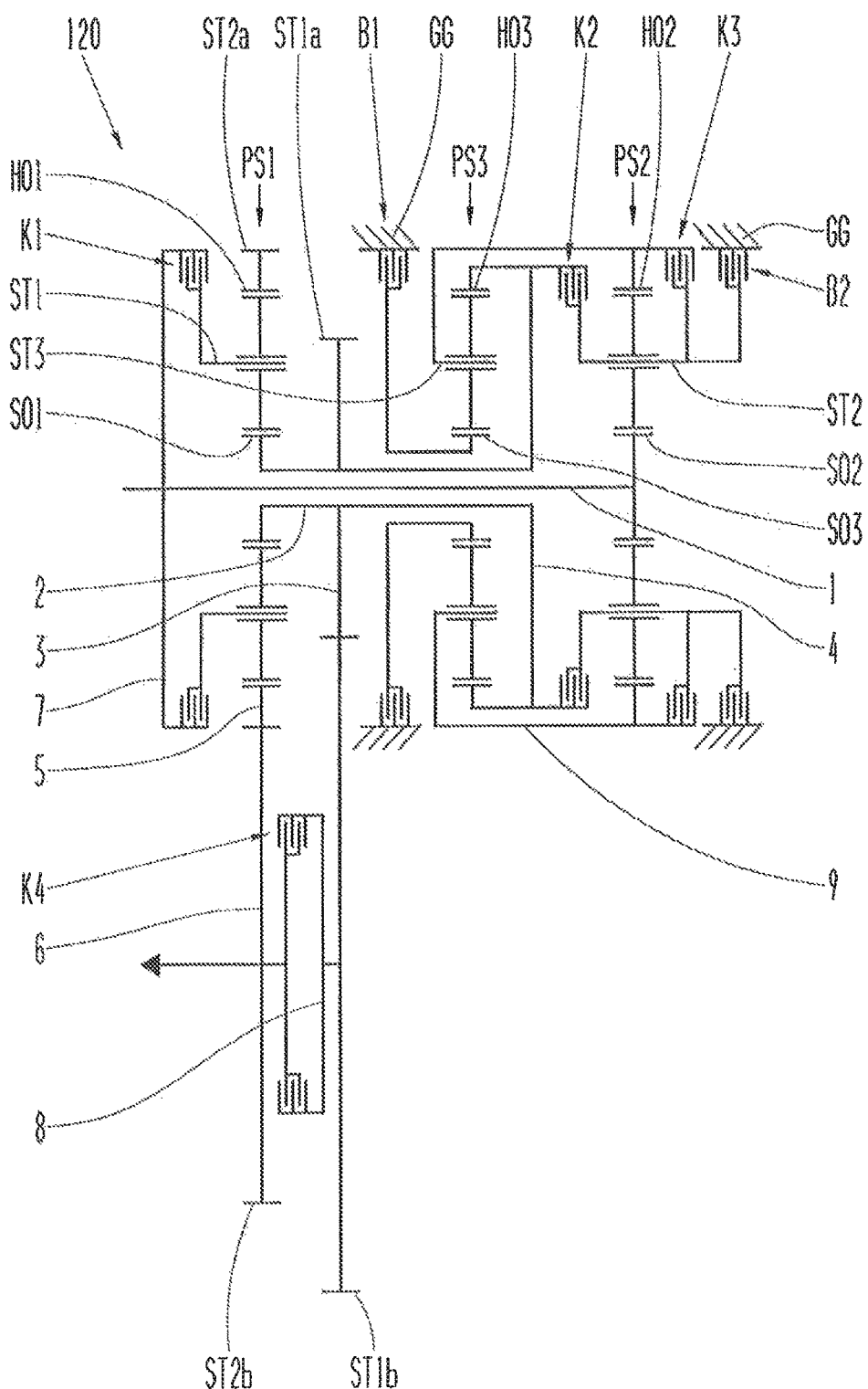
FIGS. 7 and 8 show blocking variants of a second main system of a multi-stage transmission according to one exemplary embodiment of the present invention.
Figure 8:
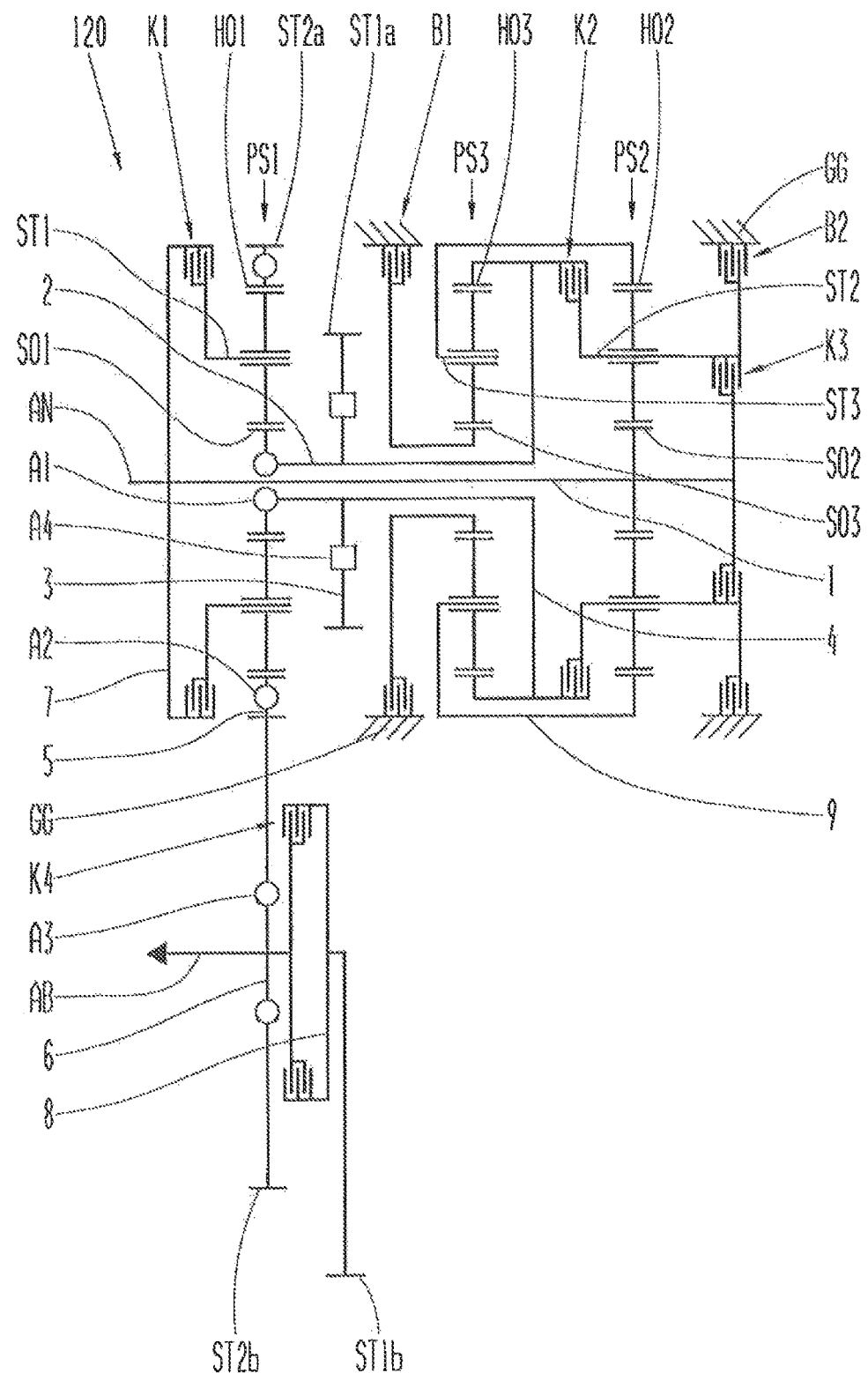
Figure 13:
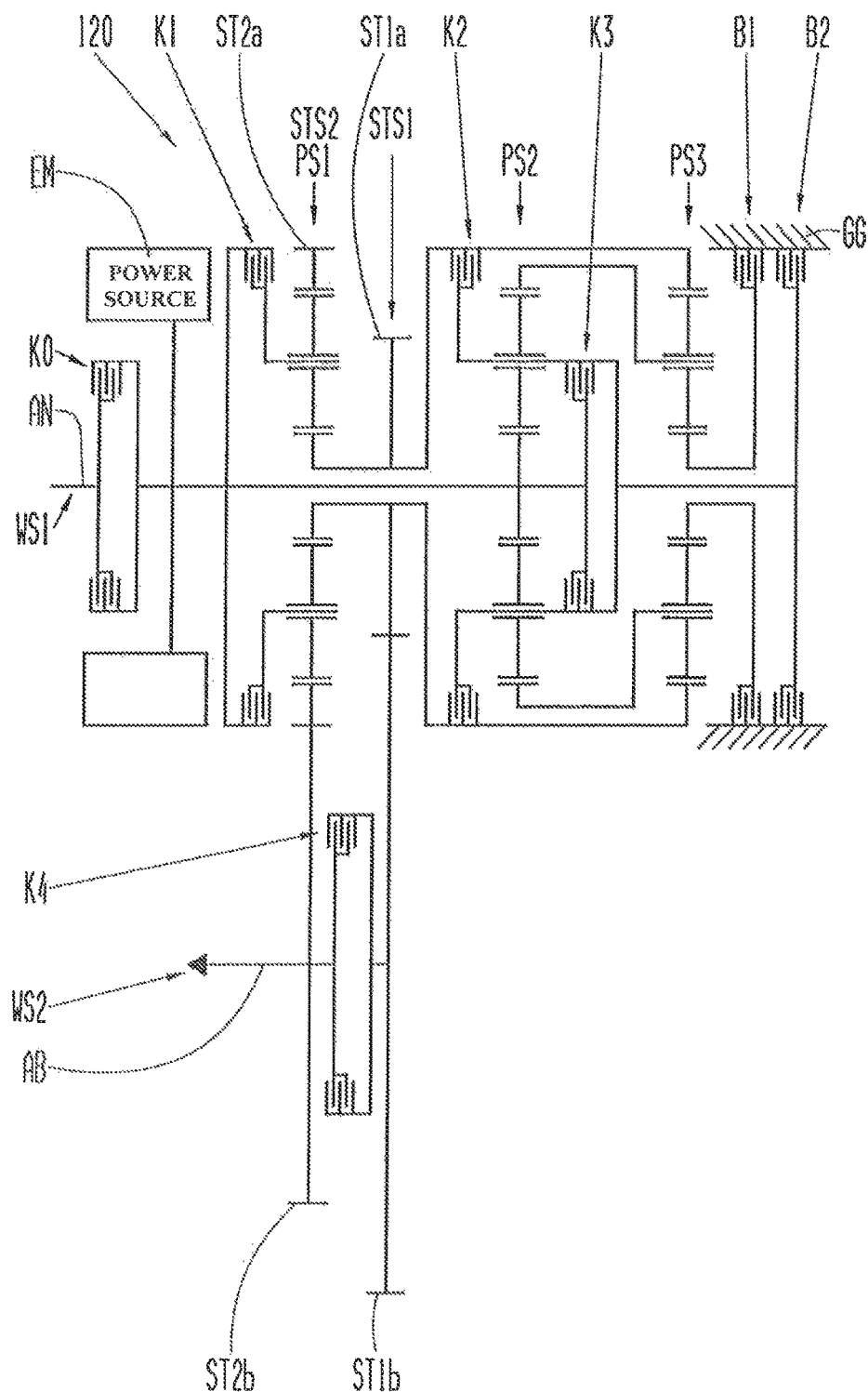
FIG. 13 shows a schematic representation of the first main system having a power source according to one exemplary embodiment of the present invention.
Figure 14:
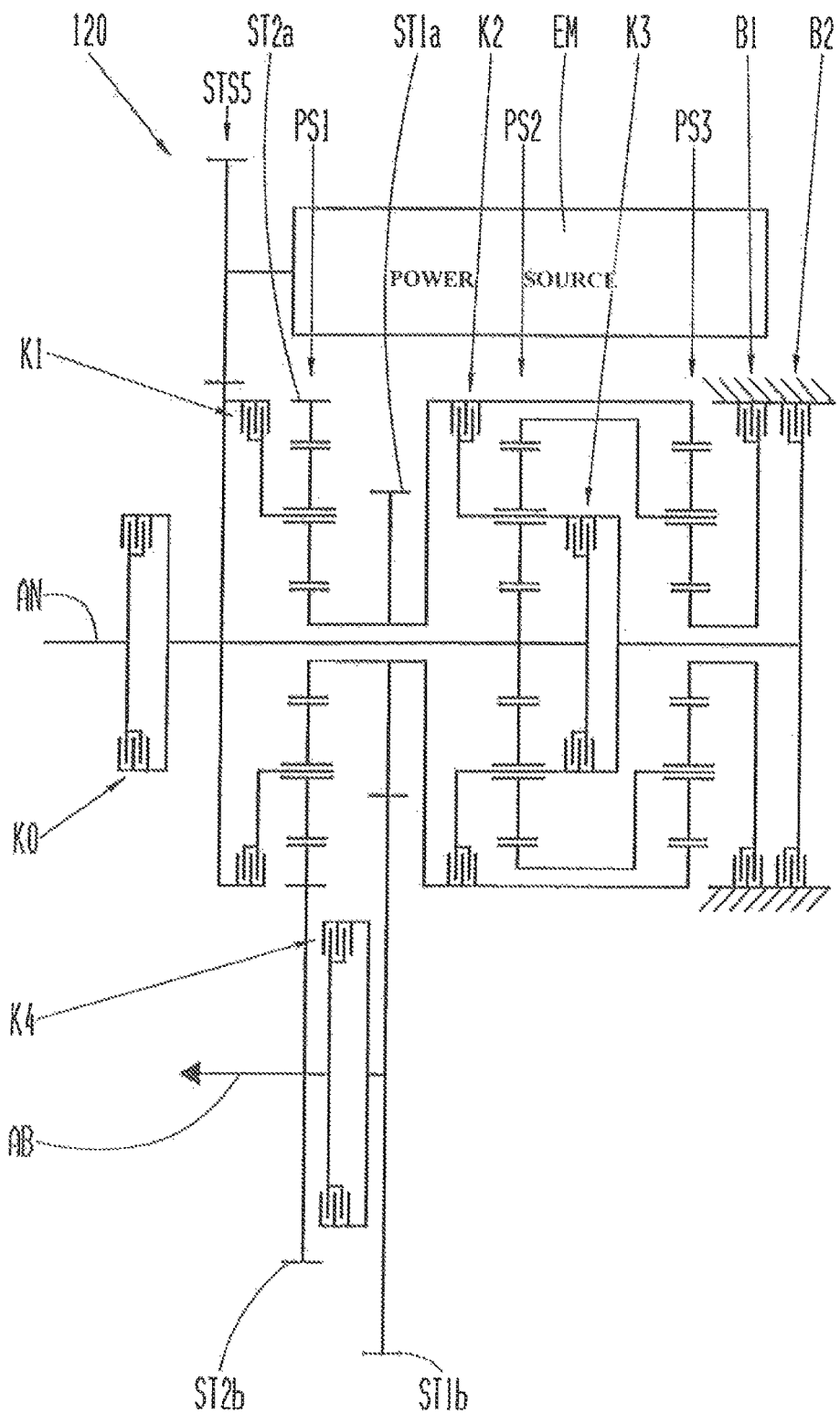
FIG. 14 shows a schematic representation of a multi-stage transmission having a power source according to one exemplary embodiment of the present invention.

Provided below with reference to FIG. 1 is an overview of the use of a power shiftable multi-stage transmission. A first main system of a power shiftable multi-stage transmission is then presented in FIG. 2 as one exemplary embodiment of the present invention and subsequently described with reference to FIGS. 4 and 5 in different blocking variants. A second main system of a power shiftable multi-stage transmission and different embodiment variants thereof are depicted in FIGS. 6 through 8. FIGS. 9 through 12 show a third main system of a power shiftable multi-stage transmission and different embodiment variants thereof. FIGS. 13 and 14 show a hybridization of a power shiftable multi-stage transmission as exemplified by the first main system. FIG. 3 shows a shift pattern for a power shiftable multi-stage transmission according to the invention.

FIG. 1 shows a schematic representation of a vehicle 100 having an engine 110 and a power shiftable multi-stage transmission 120 in planetary design according one exemplary embodiment of the present invention. The power shiftable multi-stage transmission 120, also called planetary power shift transmission or power shift unit, is installed in the vehicle 100 in front transverse design. The engine 110, for example, an internal combustion engine, is connected to the power shiftable multi-stage transmission 120 by means of an input drive shaft AN. An output shaft AB of the power shiftable multi-stage transmission connects the power shiftable multi-stage transmission 120 to the front axle of the vehicle 100, in order to drive the vehicle 100.

According to one exemplary embodiment, the power shiftable multi-stage transmission comprises three planetary gear sets, two or, respectively, three spur gear stages and six shift elements, four of which are clutches and two are brakes, wherein two shift elements are to be shifted simultaneously. The power shiftable multi-stage transmission 120 has no fixed housing couplings and may shift nine forward gears and one reverse gear. A hydrodynamic torque converter, a hydrodynamic clutch, an auxiliary start-up clutch, an integrated start-up clutch or start-up brake, an auxiliary electric machine or a power shuttle unit or, respectively, power reverser unit may serve as a start-up element.

Figure 2:
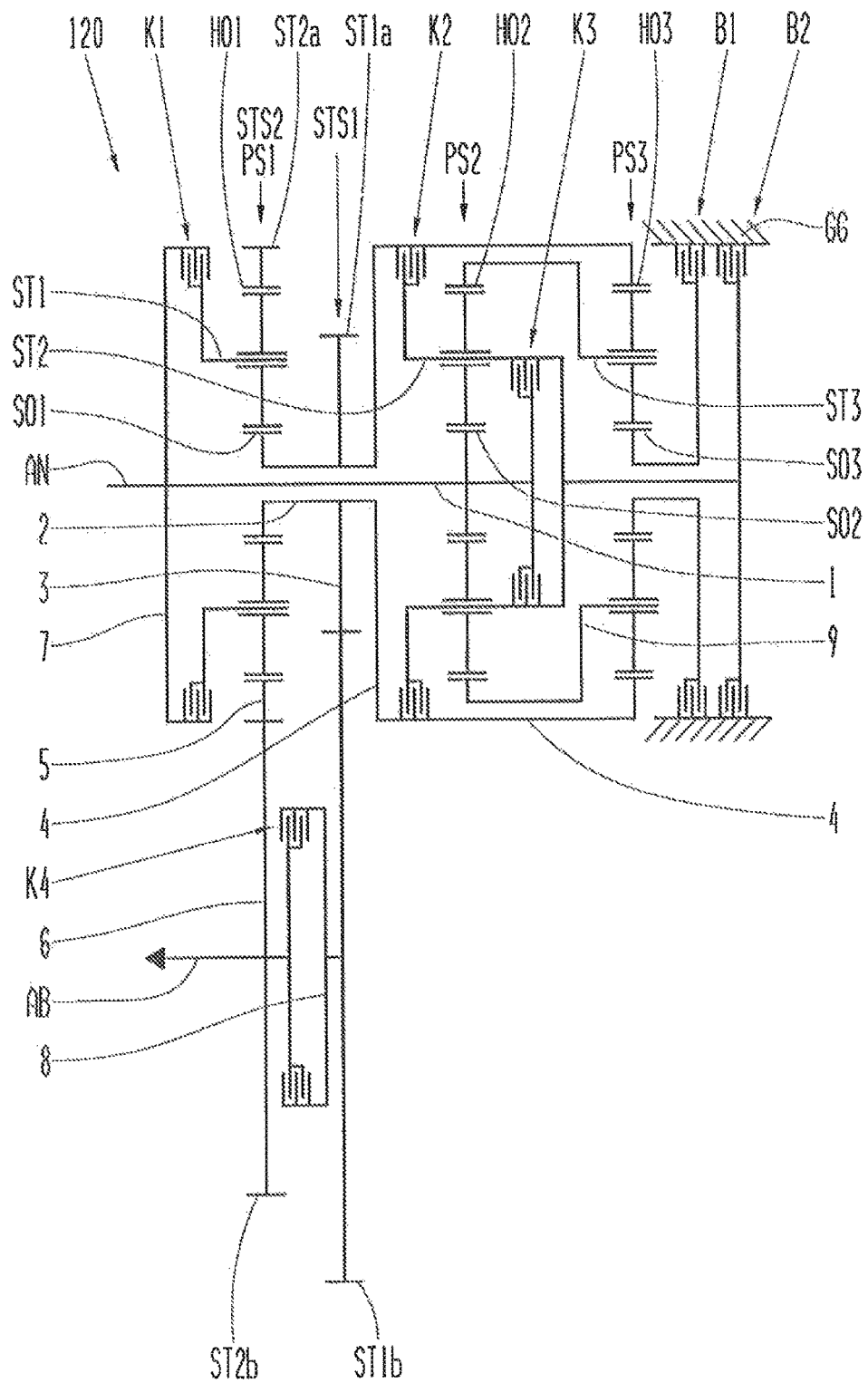
FIG. 2 shows a transmission diagram of a 9-gear multi-stage transmission according to one exemplary embodiment of the present invention.

FIG. 2 shows a transmission diagram of a power shiftable multi-stage transmission 120 according to one exemplary embodiment of the present invention. The exemplary embodiment shows one embodiment of a multi-stage transmission 120 according to the described invention, referred to as first main system. The power shiftable multi-stage transmission 120 may be the multi-stage transmission 120 shown with reference to FIG. 1. According to this exemplary embodiment, the multi-stage transmission 120, also called planetary power shift transmission, is implemented as a 9-gear multi-stage transmission. The multi-stage transmission 120 comprises two parallel shaft trains WS1, WS2, six shift elements K1, K2, K3, K4, B1, B2, two spur gear stages STS1, STS2 and three planetary gear sets PS1, PS2, PS3, all of which are disposed in a housing GG of the multi-stage transmission 120. All three planetary gear sets PS1, PS2, PS3 in this exemplary embodiment are designed as simple minus planetary gear sets, the ring gear HO1, HO2, HO3 of each of which rotates in a direction opposite the sun gears SO1, SO2, SO3 when carrier ST1, ST2, ST3 is immobilized. A minus planetary gear set is known to have planetary gears rotatably mounted on a planet carrier, which mesh with sun gear and ring gear of this planetary gear set. The three planetary gear sets PS1, PS2, PS3 are disposed in an axial direction in the sequence "PS1, PS2, PS3" coaxially one behind the other on the first shaft train WS1 of the two parallel shaft trains WS1, WS2.

A first spur gear ST1a of a first spur gear stage STS1 of the two spur gear stages STS1, STS2 and a first spur gear ST2a of a second spur gear stage STS2 of the two spur gear stages STS1, STS2 are disposed coaxially one behind the other on the first shaft train WS1 between the first planetary gear set PS1 and the second planetary gear set PS2. The two spur gears ST1a, ST2a, together with the three planetary gear sets PS1, PS2, PS3, are disposed in the sequence "PS1/ST2a, ST1a, PS2. PS3" coaxially one behind the other on the first shaft train WS1.

The input drive shaft AN is disposed on the first shaft train WS1, the output shaft AB is disposed on a second shaft train WS2 of the two parallel shaft trains WS1, WS2. In addition, the two shaft trains WS1, WS2 are connected to one another via the two spur gear stages STS1, STS2.

The shift elements K1, K2, K3, K4 are designed as clutches, the two shift elements B1, B2 are designed as brakes and are referred to in part as such in the following. Various transmission ratios between the input drive shaft AN and the output shaft AB may be achieved through selective engagement of the six shift elements K1 K2, K3, K4, B1, B2. In this way, at least nine forward gears and at least one reverse gear may be implemented. Described below is a coupling among the individual elements of the three planetary gear sets PS1, PS2, PS3 to both spur gear stages STS1, STS2 and to the input drive shaft AN and to the output shaft AB.

The multi-stage transmission 120 has at least nine connecting elements, which are designated as 1 through 9. The connecting elements 1, 2, 3, 4, 5, 6, 7, 8, 9 may be designed as shafts, wherein within each of the connecting elements 1, 2, 3, 4, 5, 6, 7, 8, 9 one or multiple shift elements may also be disposed, as is explained in greater detail below. As shown in FIG. 2, a sun gear SO2 of a second planetary gear set PS2 of the three planetary gear sets PS1, PS2, PS3 and the input drive shaft AN are torsion-resistantly connected to one another and form a first connecting element 1. A sun gear SO1 of a first planetary gear set PS1 of the three planetary gear sets PS1, PS2, PS3, a spur gear STS1a of a first spur gear stage STS1 and a ring gear HO3 of the third planetary gear set PS3 of the three planetary gear sets PS1, PS2, PS3 are connected to one another via a second, third and fourth connecting element 2, 3, 4. The second, third and fourth connecting element 2, 3, 4 have a shared connection point. The second connecting element connects the shared connection point of the second, third and fourth connecting element 2, 3, 4 to the sun gear SO1 of the first planetary gear set PS1. The third connecting element 3 connects the shared connection point of the second, third and fourth connecting elements 2, 3, 4 to the first spur gear ST1a of the first spur gear stage STS1. The fourth connecting element 4 connects the shared connection point of the second, third and fourth connecting element 2, 3, 4 to the ring gear HO3 of the third planetary gear set PS3.

The second connecting element 2 and the fourth connecting element 4 are connected to one another, such that a connection also exists between the ring gear HO3 of the third planetary gear set PS3 and the sun gear SO1 of the first planetary gear set PS1. The first spur gear ST1a of the second spur gear stage STS2 is connected to a ring gear HO1 of the first planetary gear set PS1 and forms a fifth connecting element 5. A second spur gear ST2b of the second spur gear stage STS2 and the output shaft AB are connected and form a sixth connecting element 6. A carrier ST1 of the first planetary gear set PS1 is connected to the input drive shaft AN and forms a seventh connecting element 7. A second spur gear ST1b of the first spur gear stage STS1 and the output shaft AB are connected and form an eighth connecting element 8. A ring gear HO2 of the second planetary gear set PS2 and a carrier ST3 of the third planetary gear set PS3 are torsion-resistantly connected to one another and form a ninth connecting element 9.

The seventh connecting element 7 has a first shift element K1 of the six shift elements K1, K2, K3, K4, B1, B2, the first shift element K1 being disposed in the flow of power between the input drive shaft AN and the carrier ST1 of the first planetary gear set PS1. The first shift element K1 is designed as a clutch. A second shift element K2 of the six shift elements K1, K2, K3, K4, B1, B2 is disposed in the flow of power between the fourth connecting element 4 and a carrier ST2 of the second planetary gear set PS2. A third shift element K3 of the six shift elements K1, K2, K3, K4, B1, B2 is disposed in the flow of power between the carrier ST2 of the second planetary gear set PS2 and the input drive shaft AN. The eighth connecting element 8 has a fourth shift element K4 of the six shift elements K1, K2, K3, K4, B1, B2, the fourth shift element K4 being disposed in the flow of power between the second spur gear ST1b of the first spur gear stage STS1 and the output shaft AB. A fifth shift element B1 of the six shift elements K1, K2, K3, K4, B1, B2 is disposed in the flow of power between the sun gear SO3 of the third planetary gear set PS3 and a transmission housing GG. A sixth shift element B2 of the six shift elements K1, K2, K3, K4, B1, B2 is disposed in the flow of power between the carrier ST2 of the second planetary gear set PS2 and the transmission housing GG.

In accordance with the spatial arrangement of the three planetary gear sets and the two first spur gears of the two spur gear stages, as seen in the axial direction in the sequence "PS1/ST2a, ST1a, PS2, PS3", the first connecting element 1 of the multi-stage transmission 120 runs centrically in sections within the second connecting element 2, the third connecting element 3 and the fourth connecting element 4. In addition, the seventh connecting element with the first shift element K1 encompasses the input drive shaft AN, or, respectively, the first connecting element 1 in sections in an axial direction. The second spur gear ST2a of the first spur gear stage is disposed radially above the first planetary gear set PS1.

In the exemplary embodiment depicted in FIG. 2, the fifth shift element B1 and the sixth shift element B2, thus, the two brakes B1, B2, are disposed, from a spatial perspective, axially directly adjacent one another in an area outside the sequence "PS1/ST2A, ST1a, PS2, PS3" next to the third planetary gear set PS3. In this arrangement, the fifth shift element B1 is disposed between the third planetary gear set PS3 and the sixth shift element B2. The fifth and the sixth shift element B1, B2 are connected to the transmission housing GG. The kinematic link of the fifth and sixth shift elements B1, B2 to the second and third planetary gear set PS2, PS3 in this arrangement variant requires the shift element B1 to be disposed closer than the shift element B2 to the third planetary gear set PS3.

The spatial arrangement of the shift elements B1, B2 depicted in FIG. 2 is understood to be exemplary. Thus, the shift element B1 may, for example, also be disposed at least partially radially above the shift element B2 or, alternatively, the sixth shift element B2 may be disposed in the area of the rotational axis of the first shaft train WS1.

In the exemplary embodiment depicted in FIG. 2, the third shift element K3 is disposed axially directly between the carrier ST2 of the second planetary gear set PS2 and the carrier ST3 of the third planetary gear set PS3. The fourth connecting element, that is, the connection of the ring gear HO3 of the third planetary gear set PS3 to the shared connection point of the second, third and fourth connecting element 2, 3, 4 completely encompasses the ninth connecting element 9, the second shift element K2, the third shift element K3 and the second planetary gear set PS2 in the axial direction. The spatial arrangement of the two second spur gears ST1b, ST2b of both spur gear stages STS1, STS2, as viewed in the axial direction on the second shaft train WS2, is in the form "ST2b, ST1b". The fourth shift element K4 is disposed between both second spur gears ST1b, ST2b of the second spur gear stages STS1, STS2.

The first four shift elements K1, K2, K3, K4, i.e. the four clutches are implemented in one exemplary embodiment as friction-locking, shiftable lamellar clutches, but may of course be implemented in another exemplary embodiment as a form-locking shiftable claw clutch or cone clutch. The shift elements B1, B2 implemented as brakes are implemented in one exemplary embodiment as friction-locking, shiftable lamellar brakes, but may also be implemented according to other exemplary embodiments as friction-locking, shiftable band brakes or as form-locking, shiftable claw brakes or cone brakes.

Figure 4:
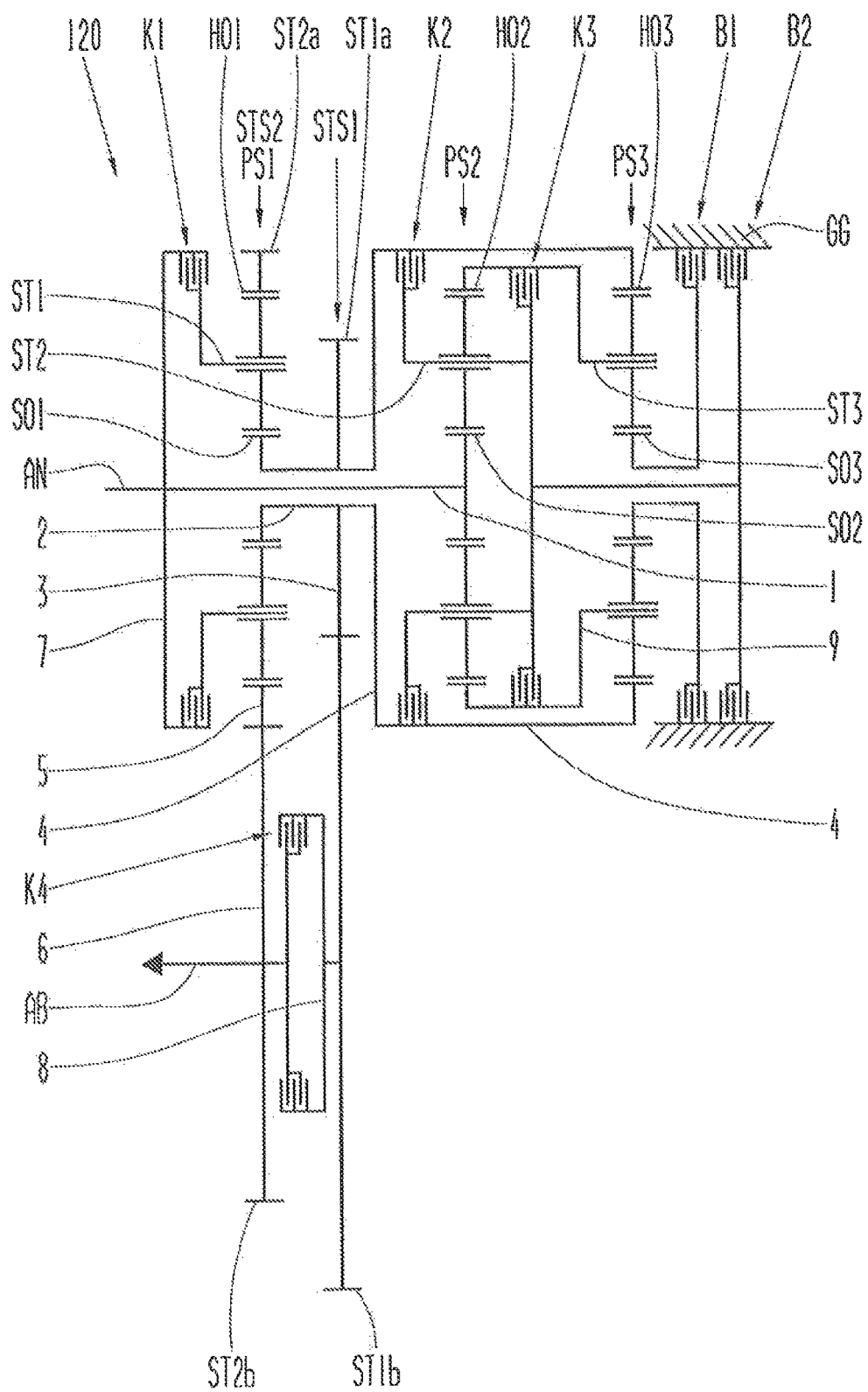
FIGS. 4 and 5 show embodiment variants of a first main system of a multi-stage transmission according to one exemplary embodiment of the present invention.

Multiple, operatively equivalent transmission variants may be derived from the transmission 120 depicted in FIG. 2. There are three additional, operatively equivalent arrangement options for the clutch K1 of the main system shown in FIG. 2, for the clutch K4 one additional arrangement option. This is explained in detail in the following FIG. 5. In addition, another embodiment variant is implementable if the arrangement of the third shift element and the coupling of the second planetary gear set is modified. Thus, it is possible to replace the blocking of the second planetary gear set PS2 with the third shift element K3, or the coupling K3—coupling of sun and carrier, as depicted in FIG. 2 with the first main system—with a coupling of carrier and ring gear. Such an embodiment variant is depicted in FIG. 4. Connectability permitting, a blocking of sun and ring gear is also possible.

FIG. 3 shows an exemplary shift pattern of a multi-stage transmission according to one exemplary embodiment of the present invention. The multi-stage transmission or the planetary power shift transmission may be one of the multi-stage transmissions previously described or described below.

Viewed from left to right, gear steps are indicated in the first column in the table shown in FIG. 3, each of which refer to a gear of the multi-stage transmission. In the following six columns, reserved for the six shift elements B1, B2, K1, K2, K3, K4, as previously described, for example, with reference to FIG. 2, an "x" is entered in the table for each engaged shift element B1, B2, K1, K2, K3, K4. In this case, the two brakes B1 and B2 are listed first and followed by the four clutches K1, K2, K3, K4. When a shift element B1, B2, K1, K2, K3, K4 is engaged, a power transmission occurs via the respective shift element B1, B2, K1, K2, K3, K4. In this case, the respective shift element B1, B2, K1, K2, K3, K4 may embody a rigid connecting element. The next to last column shows an exemplary transmission ratio i, followed in the last column by a gear increment φ derived therefrom. The engaged shift elements marked with an "x" may also be referred to by the English expression "engaged shifting elements". For each gear, three of the shift elements B1, B2, K1, K2, K3, K4 are disengaged and three of the shift elements B1, B2, K1, K2, K3, K4 are engaged.

In addition to the shift logic, the shift pattern also shows exemplary values for the respective transmission ratios i of the individual gear steps and the gear increments φ to be determined therefrom. The transmission ratios indicated are derived from the (typical) stationary gear ratios of the three planetary gear sets PS1, PS2, PS3 of minus 2.404 for the first planetary gear set PS1, minus 1.953 for the second planetary gear set PS2 and minus 2.191 for the third planetary gear set PS3 and the for the first spur gear stage STS1 of 3.235 and for the second spur gear stage STS2 of 1.000. The (typical) stationary gear ratios for the third spur gear stage (STS3) and for the fourth spur gear stage STS4 are, in each case 1.000. The stationary gear ratios of the spur gear stages are modifiable in this case within a designed-related tolerance range while having no substantial effect on the transmission ratios. The shift pattern also shows that during sequential shifting, double shifting and group shifting are avoided. Two adjacent gear steps together use two of the required three shift elements. The sixth gear is preferably designed as a direct gear. The indicated ratios and the variables derived therefrom represent a preferred embodiment. The person skilled in the art may also use other values here depending on the requirements of the multi-stage transmission.

As previously described, for example with reference to FIG. 2, the six shift elements K1, K2, K3, K4, B1, B2 consist of the four clutches K1, K2, K3, K4 and the two brakes B1, B2. In the following description, the term clutch K1, K2, K3, K4 is selected for the first four shift elements K1, K2, K3, K4, and the term brake B1, B2 is selected for the fifth and sixth switch element B1, B2.

The first forward gear results by engaging the brake B1 and the clutches K2, K4, the second forward gear results by engaging the clutches K2, K3, K4, the third forward gear results by engaging the brake B1 and the clutches K3, K4, the fourth forward gear by engaging the clutches K1, K3, K4, the fifth forward gear by engaging the brake B1 and the clutches K1, K3, the sixth forward gear by engaging the clutches K1, K2, K3, the seventh forward gear by engaging the brake B1 and the clutches K1. K2, the eighth forward gear by engaging the brake B2 and the two clutches K1, K2, and the ninth forward gear by engaging the two brakes B1, B2 and the clutch K1. As is further apparent from the shift pattern in FIG. 3, the reverse gear results by engaging the two brakes B1, B2 and the clutch K4.

The ratio i may also be referred to by the term "ratio". A ratio i of 5.531 is derived for the first gear referred to as gear step 1, a ratio i of 3.228 is derived for the second gear referred to as gear step 2, a ratio i of 2.232 is derived for the third gear, a ratio i of 1.619 is derived for the fourth gear, a ratio i of 1.207 is derived for the fifth gear, a direct ratio i of 1.000 is derived for the sixth gear, a ratio i of 0.862 is derived for the seventh gear, a ratio i of 0.722 is derived for the eighth gear, and a ratio i of 0.815 is derived for the ninth gear. As is further apparent from the shift pattern, a ratio i of minus 5.165 is derived for the reverse gear. Consequently, from the first gear to the second gear constitutes a gear increment φ of 1,713, also referred to by the term "step", from the second gear to the third gear a gear increment φ of 1.446, from the third gear to the fourth gear a gear increment ϕ of 1.379, from the fourth gear to the fifth gear a gear increment ϕ of 1.341, from the fifth gear to the sixth gear a gear increment ϕ of 1.207, from the sixth gear to the seventh gear a gear increment ϕ of 1.160, from the seventh gear to the eighth gear a gear increment ϕ of 1.194, from the eighth gear to the ninth gear a gear increment so of 1.174. Thus, the transmission exhibits a spread of 8.993. The ratio of the reverse gear to the first gear is minus 0.934, and is therefore very close to an ideal value of minus 1.

The multiple gears M4', M4", M4'" listed in the first column are additional shift combinations, which also represent the fourth gear. The first multiple gear M4' results by engaging the brake B2 and the clutches K1, K4, the second multiple gear M4" results by engaging the clutches K1, K2, K4 and the third multiple gear M4'" results by engaging the brake B1 and the clutches K1, K4.

According to one exemplary embodiment of the present invention, a start-up of the vehicle, for example, of the vehicle shown in FIG. 1, is possible with a shift element integrated in the transmission. Here, a shift element is particularly suited which is required in the first forward gear and in the reverse gear, in this case the brake B1 or the clutch K4. Advantageously, the clutch K4 is employed as a start-up element integrated in the transmission, thus a start-up is possible even in the first four forward gears and in the reverse gear.

In principle, the level of the stationary gear ratios, and therefore the level of the transmission ratios, may be freely selected. According to one exemplary embodiment, preferred stationary gear ratios of the main system are −2.404 for the first planetary gear set PS1, −1.953 for the second planetary gear set PS2, −2.191 for the third planetary gear set PS3, and 3.235 for the spur gear stage STS1 (ST1a-ST1b), 1.000 for the second spur gear stage STS2 (ST2a-ST2b), and 1.000 for the embodiment variants with three spur gear stages shown in FIGS. 9 through 12 for the third spur gear stage STS3 (ST3a-ST3b), and 1.000 for the fourth spur gear stage STS4 (ST4a-ST4b). All of the exemplary embodiments shown in FIGS. 1 and 3 through 14 result in operatively equivalent transmission variants, which may use the same shift pattern.

Depicted below in FIGS. 4 through 8 are possible arrangement variants and blocking variants of the multi-stage transmission 120 shown in FIG. 2. In principle, the shift elements K1, K2, K3, K4, B1, B2 of the exemplary embodiment of a multi-stage transmission 120 depicted in FIG. 2 may be spatially arbitrarily disposed, and is limited only by the dimensions and the exterior shape of the transmission housing GG. Accordingly, depicted in the following figures are exemplary component arrangement variants of the multi-stage transmission 120 according to FIG. 2, all kinematic couplings of the planetary gear sets, spur gear stages, shift elements and shafts or connecting elements to one another being adopted from FIG. 2 unchanged.

FIG. 4 shows a blocking variant of the first main system of a multi-stage transmission 120 according to one exemplary embodiment of the present invention previously described with reference to FIG. 2.

The gear pattern depicted in FIG. 4 corresponds to the gear pattern of a multi-stage transmission 120 depicted in FIG. 2, from which multiple operatively equivalent transmission variants may be derived, wherein another operatively equivalent arrangement variant is shown for the third shift element K3 and the coupling of the second planetary gear set PS2.

The third shift element K3 of the six shift elements K1, K2, K3, K4, B1, B2 is disposed in the flow of power between the carrier ST2 of the second planetary gear set PS2 and the ninth connecting element 9. This results, therefore, in a torsionally resistant connection between the carrier ST2 of the second planetary gear set PS2 and the ring gear HO2 of the second planetary gear set PS2 when clutch K3 is engaged.

Apart from the coupling of sun SO2 and carrier ST2 of the second planetary gear set PS2 by means of the third shift element K3 or the coupling K3 which is replaced in FIG. 4 by an operatively equivalent coupling of carrier ST2 and ring gear HO2 of the second planetary gear set PS2 by means of the third shift element K3 or the coupling K3, the gear pattern depicted in FIG. 4 corresponds to the gear pattern of a multi-stage transmission depicted in FIG. 2.

Figure 5:
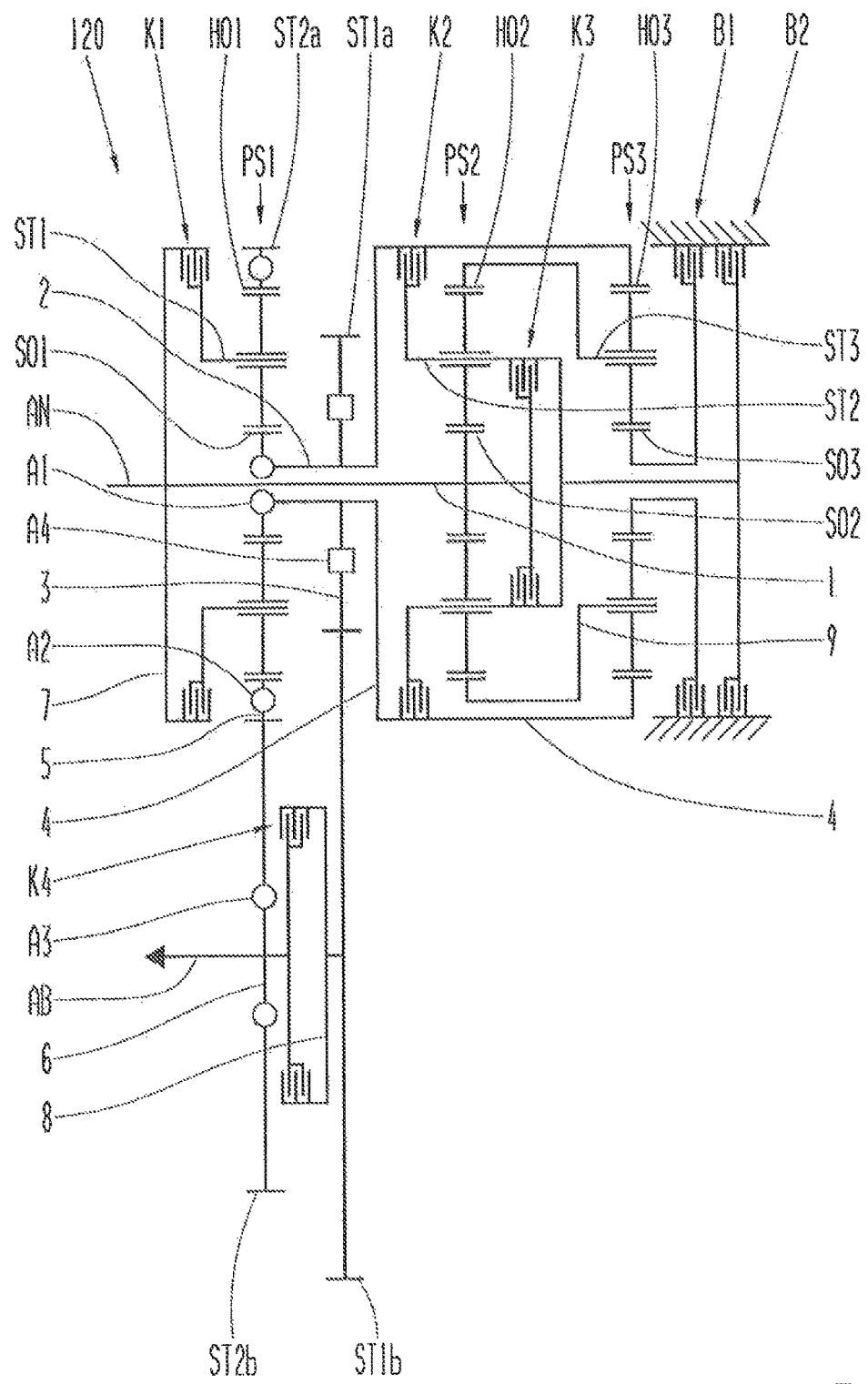

FIG. 5 shows an overview of a blocking variant of the first main system of a multi-stage transmission described previously with reference to FIG. 2, according to different exemplary embodiments of the present invention.

The gear pattern depicted in FIG. 5 corresponds to the gear pattern of a multi-stage transmission 120 depicted in FIG. 2, from which multiple operatively equivalent transmission variants may be derived, wherein three additional operatively equivalent arrangement variants are show for the first shift element K1 or the clutch K1, and an additional arrangement variant is shown for the fourth shift element K4, or the clutch K4. The three arrangement variants for the clutch K1 are designated in FIG. 1 as A1, A2, A3, the arrangement variants for the clutch K4 as A4.

A first arrangement variant A1 of the clutch K1 is an arrangement of the clutch K1 on the second connecting element 2 between the sun gear SO1 of the first planetary gear set and the third and fourth connecting element 3, 4. In the first arrangement variant A1, the first shift element K1 is disposed in the flow of power between the ring gear HO3 of the third planetary gear set PS3, the first spur gear ST2a of the second spur gear stage STS2 and the sun gear SO1 of the first planetary gear set PS1.

A second arrangement variant A2 of the clutch K1 is an arrangement of the clutch K1 on the fifth connecting element 5 between the ring gear HO1 of the first planetary gear set and the first spur gear ST1a of the first spur gear set STS1. In the second arrangement variant A2, the first shift element K1 is disposed in the flow of power between a ring gear HO1 of the first planetary gear set PS1 and a first spur gear ST1a of the first spur gear stage STS1.

A third arrangement variant A3 of the clutch K1 is an arrangement of the clutch K1 on the sixth connecting element 6 between the second spur gear ST2b of the second spur gear stage STS2 and the output shaft AB. In the third arrangement variant A3, the first shift element K1 is disposed in the flow of power between a second spur gear ST2b of the second spur gear stage STS2 and the output shaft AB.

In an arrangement variant A4 of the clutch K4, the third connecting element 3 has the clutch K4. In the arrangement variant A4 of the clutch K4, the fourth shift element K4 is disposed in the flow of power between the shared connection point of the second, third and fourth connecting element 2, 3, 4 and the first spur gear ST1a of the first spur gear stage STS1. When the clutch K4 in the arrangement variant A4 is disengaged, the first spur gear ST1a of the first spur gear stage STS1 is decoupled from the connection of sun gear SO1 of the first planetary gear set PS1 and the ring gear HO3 of the third planetary gear set PS3.

When the clutch K1 in a first arrangement variant A1 is disposed in the second connection element 2, the seventh connecting element 7 then establishes a torsion-resistant connection between the input drive shaft AN and the carrier ST1 of the first planetary gear set PS1, and the sun gear SO1 of the first planetary gear set may be coupled via the clutch K1 to the first spur gear ST1a of the first spur gear stage STS1, to the ring gear HO3 of the third planetary gear set PS3 and, via the clutch K2, to the carrier ST2 of the second planetary gear set PS2. In this case, all eight combinations of the position disclosed in FIG. 2 for the clutch K1 and of the three arrangement variants A1, A2, A3 for the clutch K1, and the position disclosed in FIG. 2 for the clutch K4 and the arrangement variant A4 for the clutch K4 are possible. The arrangement variants shown may be combined as operatively equivalent with the arrangement variants and coupling variants for the third clutch K3 disclosed in FIG. 4. One each of the possible arrangement variants A1, A2, A3, A4 for the clutches K1 and K4 is shown in the following FIGS. 5 through 8.

Another possible gear concept may be derived from the first main system by interchanging the gear sets PS2 and PS3, which is depicted in FIG. 6, referred to as a second main system.

FIG. 6 shows a representation of a power shiftable multi-stage transmission according to one exemplary embodiment of the present invention. The exemplary embodiment shows a second main system of a multi-stage transmission 120 according to the invention described. The power-shiftable multi-stage transmission 120 may be the multi-stage transmission 120 shown with reference to FIG. 1. The multi-stage transmission 120, also referred to as planetary power shift transmission is implemented as a 9-gear multi-stage transmission according to this exemplary embodiment.

The couplings of the individual elements of the three planetary gear sets PS1, PS2, PS3 among one another to the two spur gear stages STS1, STS2 and to the input drive shaft AN and to the output shaft AB correspond to the exemplary embodiment shown in FIG. 2, although the position of the second and the third planetary gear stage PS2, PS3 has been interchanged, which results in an altered spatial arrangement of the aforementioned components and the connecting elements.

FIG. 7 shows a blocking variant of the second main system of a multi-stage transmission 120 described previously with reference to FIG. 6, according to one exemplary embodiment of the present invention.

Similar to the first main system, it is possible to replace the blocking of the second planetary gear set PS2 by the clutch K3 (coupling of sun and carrier in FIG. 6) with a coupling of carrier and ring gear (coupling K3 in FIG. 7). How a planetary gear set is blocked is irrelevant in terms of the functioning of a transmission system. Connectability permitting, a blocking of sun and ring gear is also possible.

The gear pattern depicted in FIG. 7 corresponds to the gear pattern of a multi-stage transmission 120 depicted in FIG. 6, from which multiple, operatively equivalent transmission variants may be derived, wherein another operatively equivalent arrangement variant is shown for the third shift element K3 and the coupling of the second planetary gear set PS2.

The third shift element K3 of the six shift elements K1, K2, K3, K4, B1, B2 is disposed in the flow of power between the carrier ST2 of the second power gear set PS2 and the ninth connecting element 9. Thus, when the clutch is engaged, this provides a torsion-resistant connection between the carrier ST2 of the second planetary gear set PS2 and the ring gear HO2 of the second planetary gear set PS2.

FIG. 8 shows an overview of blocking variants of the second main system of a multi-stage transmission 120 described previously with reference to FIG. 6, according to different exemplary embodiments of the present invention. Since between the first and the second main system, only the arrangement of the second and third planetary gear set has changed, but the engagements have remained the same, the blocking variants correspond to the blocking variants previously described in FIG. 5.

Multiple, operatively equivalent transmission variants may be derived from the second main system shown in FIG. 6, wherein three additional operatively equivalent arrangement variants are shown for the first shift element K1, and one additional arrangement variant for the fourth shift element K4.

The three arrangement variants for the shift element K1 are designated in FIG. 8 as A1, A2, A3, the arrangement variants for the clutch K4 is designated as A4. In a first arrangement variant A1 of the second main system, the second connecting element 2 has the first shift element K1. In a second arrangement variant A2 of the second main system, the fifth connecting element 5 has the first shift element K1. In a third arrangement variant A3 of the second main system, the sixth connecting element 6 has the first shift element K1. In a fourth arrangement variant A4 of the second main system, the third connecting element 3 has the fourth shift element K4. The arrangement variants of the first shift element K1 may be freely combined with the arrangement variants of the fourth shift element K4. The arrangement variants for the first shift element K1 and for the fourth shift element K4 shown and depicted may be combined with the arrangement variants for the third shift element K3 depicted here, and with the arrangement variants for the third shift element K3 shown in FIG. 7.

The power shiftable multi-stage transmission 120 shown in FIGS. 2 and 4 through 8 may be implemented as operatively equivalent by an arrangement of the first planetary gear set PS1 on the output shaft AB. The following FIGS. 9 through 12 show two arrangement variants and possible alternative blocking variants of a multi-stage transmission 120 according to the invention having a planetary gear set on the output shaft AB. Such a multi-stage transmission 120 is referred to hereinafter as a third main system.

Figure 9:
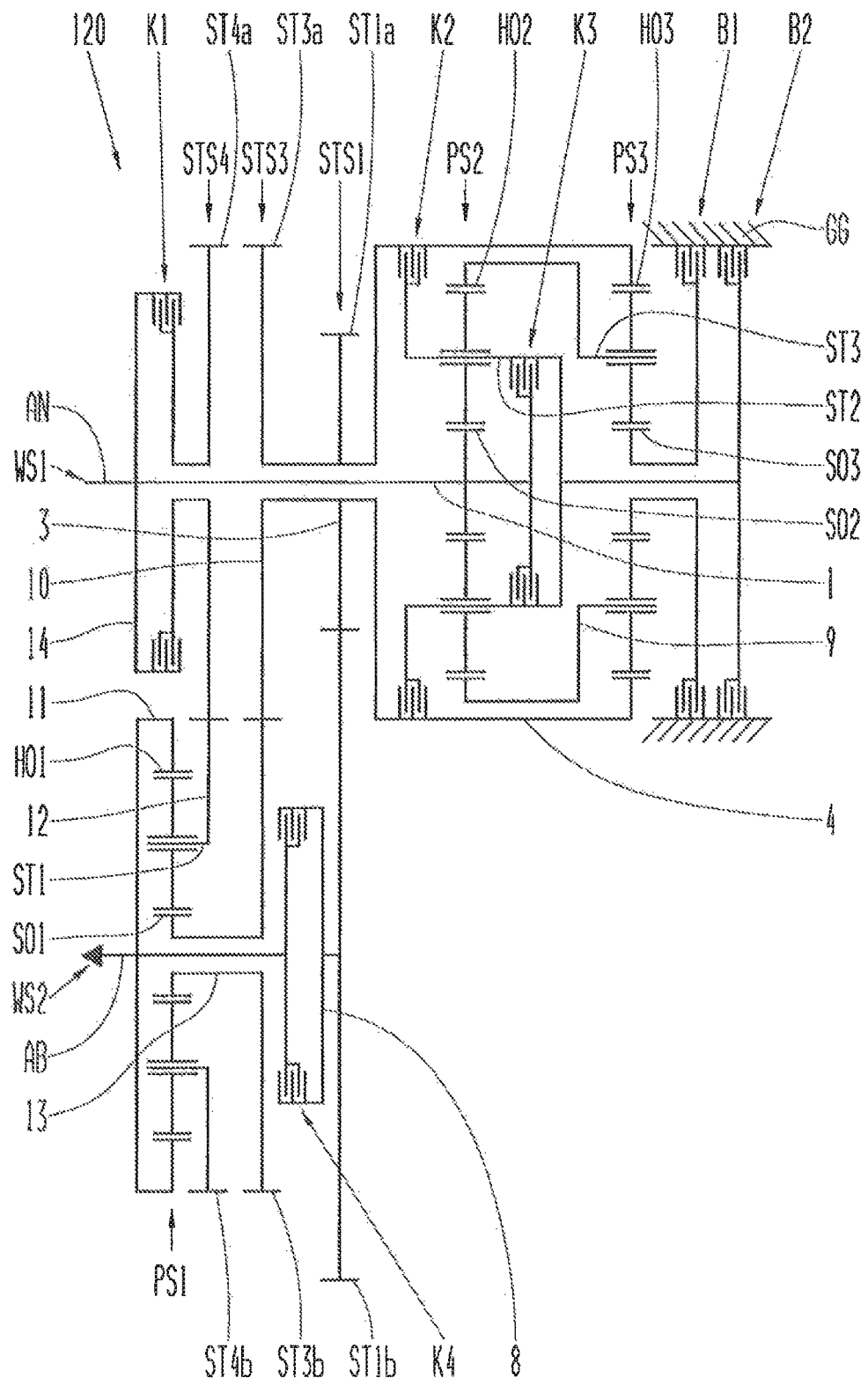
FIG. 9 shows a representation of a third main system according to one exemplary embodiment of the present invention.

FIG. 9 shows a gear pattern of a power shiftable multi-stage transmission 120 according to one exemplary embodiment of the present invention. The exemplary embodiment is based on the aforementioned third main system of a multi-stage transmission 120. The power shiftable multi-stage transmission 120 may be the multi-stage transmission 120 shown with reference to FIG. 1. The multi-stage transmission 120, also referred to as planetary power shift transmission, is implemented as a 9-gear multi-stage transmission according to this exemplary embodiment.

The multi-stage transmission 120 shown in FIG. 9 does not have a first spur gear stage STS1, as compared to the exemplary embodiments of a multi-stage transmission 120 shown in FIGS. 2 and 4 through 8, but in addition to the second spur gear stage STS2 described previously with reference to FIG. 2, it does have, two additional spur gear stages STS3, STS4. Thus, instead of two spur gear stages STS1, STS2, as shown for example in FIG. 2 for the first main system, here three spur gear stages STS2, STS3, STS4 are used. In this exemplary embodiment the first planetary gear set PS1 is positioned on the output shaft AB.

The multi-stage transmission 120 shown in FIG. 9 comprises two parallel shaft trains WS1, WS2, six shift elements K1, K2, K3, K4, B1, B2, three spur gear stages STS1, STS3, STS4 and three planetary gear sets PS1, PS2, PS3, which are all disposed in a housing GG of the planetary power shift transmission 120. All three planetary gear sets PS1, PS2, PS3 in this exemplary embodiment are designed as simple minus planetary gear sets, each ring gear HO1, HO2, HO3 of which rotates in a direction opposite the sun gears SO1, SO2, SO3 when the carrier ST1, ST2, ST3 is immobilized. The second and third planetary gear set PS2, PS3 are disposed in an axial direction in the sequence "PS2, PS3" coaxially one behind the other on the first shaft train WS1 of the two parallel shaft trains WS1, WS2.

A first spur gear ST4a of the fourth spur gear stage STS4, a first spur gear ST3a of a third spur gear stage STS3 of the three spur gear stages STS1, STS3, STS4 and a first spur gear ST1a of a first spur gear stage STS1 of the three spur gear stages STS1, STS3, STS4 are disposed coaxially one behind the other on the first shaft train WS1 upstream from the second planetary gear set PS2. This results in a sequence of "ST4a, S3a, ST1a, PS2, PS3".

The input drive shaft AN is disposed on the first shaft train WS1, the output shaft AB is disposed on a second shaft train WS2 of the two parallel shaft trains WS1, WS2. In addition, the two shaft trains WS1, WS2 are connected to one another via the three spur gear stages STS1, STS3, STS4.

The shift elements K1, K2, K3, K4 are designed as clutches, the two shift elements B1, B2 are designed as brakes and are in part referred to as such in the following. Different transmission ratios between the input drive shaft AN and the output shaft AB may be achieved by a selective engagement of the six shift elements K1, K2, K3, K4, B1, B2. In this way, it is possible to implement nine forward gears and at least one reverse gear.

Described below is a coupling among the individual elements of the three planetary gear sets PS1, PS2, PS3 to the three spur gear stages STS1, STS3 STS4 and to the input drive shaft AN and to the output shaft AB.

The planetary power shift transmission 120 has at least nine connecting elements, which are designated as 1, 3, 4, 8, 9, 10, 11, 12, 13, 14. The connecting elements 1, 3, 4, 8, 9, 10, 11, 12, 13, 14 may be designed as shafts, wherein shift elements, in particular clutches, may also be disposed within the connecting elements, as is explained in greater detail below.

As shown in FIG. 9, a sun gear SO2 of a second planetary gear set PS2 of the three planetary gear sets PS1, PS2, PS3 and the input drive shaft AN are torsion-resistantly connected to one another and form a first connecting element 1. A ring gear HO3 of a third planetary gear set PS3 of the three planetary gear sets PS1, PS2, PS3, and the carrier ST2 of the second planetary gear set PS2 are connected to one another via shift element K2. A ring gear HO3 of the third planetary gear set PS3 is connected to the first spur gear ST1a of the first spur gear stage STS1, and to the first spur gear ST3a of the third spur gear stage STS3 via a third, fourth, respectively, tenth connecting element 3, 4, 10. The third, fourth and tenth connecting elements 3, 4, 10 have a shared connection point. The third connecting element 3 is also connected to the first spur gear ST1a of the first spur gear stage STS1. The fourth connecting element 4 is also connected to the ring gear HO3 of the third planetary gear set PS3. The tenth connecting element 10 is also connected to the first spur gear ST3a of the third spur gear stage STS3. A second spur gear ST1b of the first spur gear stage STS1 and the output shaft AB are connected and form an eighth connecting element 8.

A ring gear HO1 of the first planetary gear set PS1 and the output shaft AB are connected and form an eleventh connecting element. A carrier ST1 of the first planetary gear set PS1 and a second spur gear ST4b of the fourth spur gear stage STS4 are connected and form a twelfth connecting element 12. A sun gear SO1 of the first planetary gear set PS1 and a second spur gear ST3b of the third spur gear stage STS3 are connected and form a thirteenth connecting element 13. The input drive shaft AN and a first spur gear ST4a of the fourth spur gear stage STS4 are connected and form a fourteenth connecting element. The fourteenth connecting element 14 has the first shift element K1. Disposed in the eighth connecting element 8 is the fourth shift element K4.

A third shift element K3 of the six shift elements K1, K2, K3, K4, B1, B2 is disposed between the sun gear SO2 of the second planetary gear set PS2 and the carrier ST2 of the second planetary gear set PS2. The eighth connecting element 8 has a fourth shift element K4 of the six shift elements K1, K2, K3, K4, B1, B2. A fifth shift element B1 of the six shift elements K1, K2, K3, K4, B1, B2 is disposed in the flow of power between the sun gear SO3 of the third planetary gear set PS3 and a transmission housing GG. A sixth shift element B2 of the six shift elements K1, K2, K3, K4, B1, B2 is disposed in the flow of power between the carrier ST2 of the second planetary gear set PS2 and the transmission housing GG.

Figure 10:
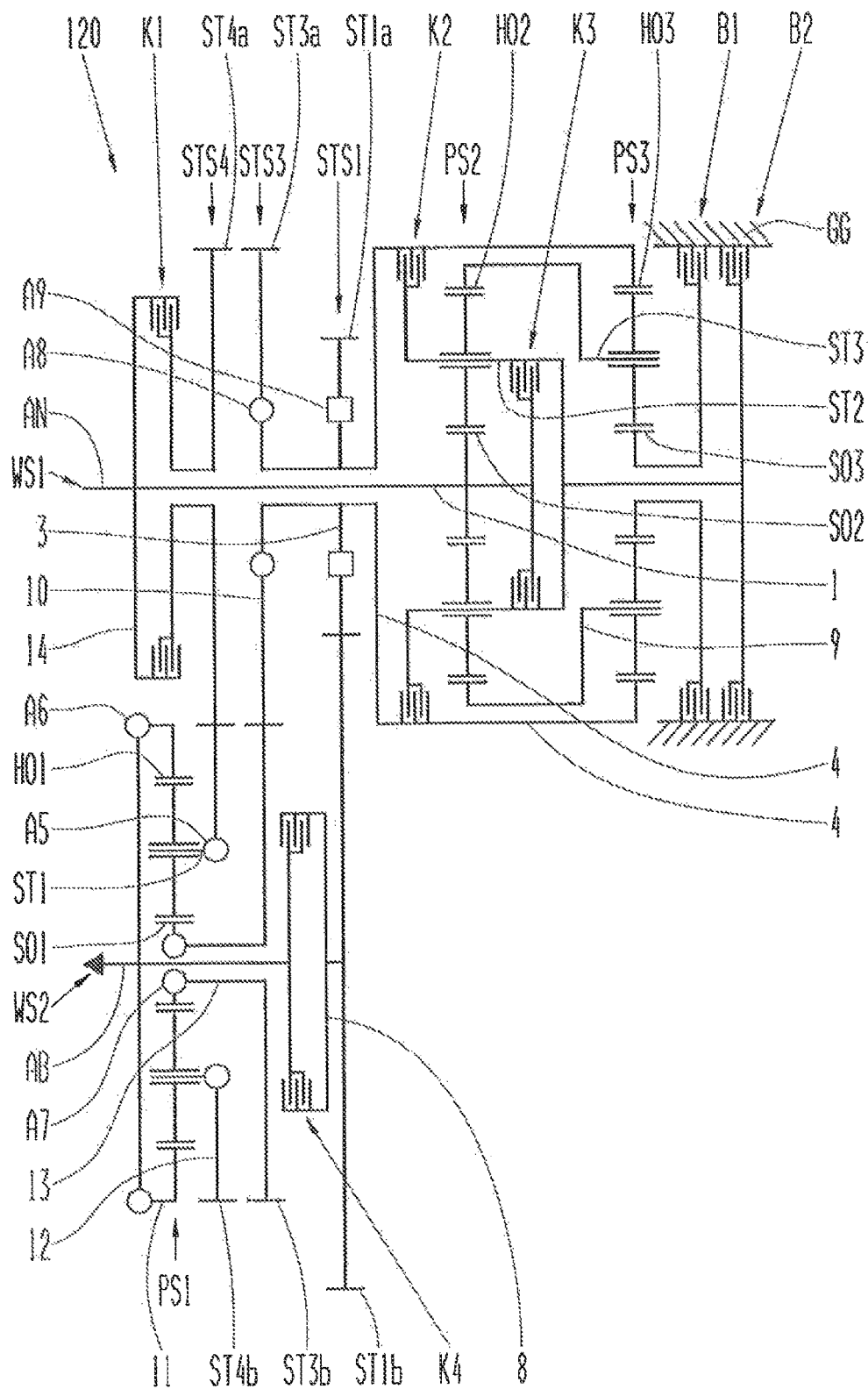
FIG. 10 shows embodiment variants of the third main system of a multi-stage transmission according to one exemplary embodiment of the present invention.
Figure 11:
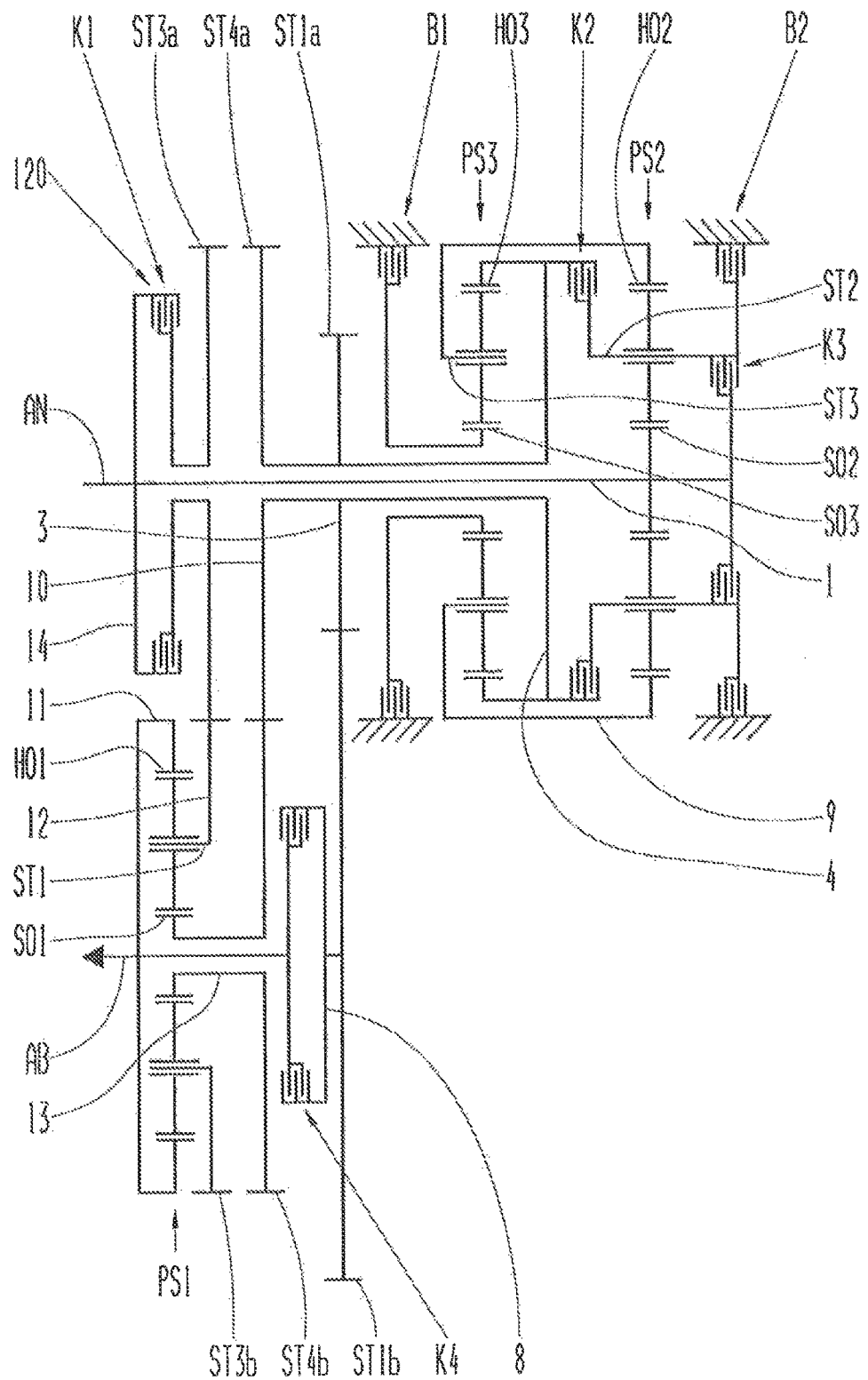
FIG. 11 shows a schematic representation of another main system as a combination of the second and third main system according to another exemplary embodiment of the present invention.

In order to save axial installation space, a gear set may be positioned on the output shaft AB. The gear set PS1, in particular, may be provided for this purpose. In this case, however, a spur gear stage is also required. This option for the second main system is depicted in the FIGS. 9 through 12. FIG. 9 shows a gear pattern of the third main system with the first planetary gear set PS1 on the output shaft AB. In this system as well, the arrangement variants are again also possible, as is depicted in FIG. 10. FIG. 11 then shows an alternative arrangement of the second and third planetary gear set PS2, PS3—similar to FIG. 6—including the first planetary gear set PS1 on the output shaft AB. FIG. 10 shows blocking variants of the third main system of the multi-stage transmission 120 described previously with reference to FIG. 9, according to one exemplary embodiment of the present invention. This involves blocking variants of the multi-stage transmission 120 operatively equivalent to the third main system described with reference to FIG. 9.

The gear pattern depicted in FIG. 10 corresponds to the gear pattern of a multi-stage transmission 120 depicted in FIG. 9, from which multiple, operatively equivalent transmission variants may be derived, wherein for the first shift element K1, or the clutch K1, there are four additional operatively equivalent arrangement variations, and another arrangement variant is possible for the fourth shift element K4, or the clutch K4. The four arrangement variants for the clutch K1 are designated in FIG. 10 as A5, A6, A7, A8, the arrangement variant for the clutch is designated as A9.

In a first arrangement variant A5, the clutch K1 is disposed in the twelfth connecting element 12 between the second spur gear ST4b of the fourth spur gear set STS4 and the carrier ST1 of the first planetary gear set PS1.

In a second arrangement variant A6, the clutch K1 is disposed in the connecting element 11 between the ring gear HO1 of the first planetary gear set PS1 and the output shaft AB.

In a third arrangement variant A7, the clutch K1 is disposed in the twelfth connecting element 12 between the second spur gear ST3b of the third spur gear stage STS3 and the sun gear SO1 of the first planetary gear set PS1.

In a fourth arrangement variant A8, the clutch K1 is disposed in the ninth connecting element between the first spur gear ST4a of the fourth spur gear stage STS4 and the shared connection point of the fourth, ninth and fourteenth connecting element.

Beside the arrangement variant in the tenth connecting element 10 between the first spur gear ST1a of the first spur gear stage STS1 and the shared connection point of the third, fourth and tenth connecting elements 3, 4, 10, there is another arrangement variant A9 for the clutch K4. In this arrangement, the clutch K4 is disposed in the third connecting element 3 between the first spur gear ST1a of the first spur gear stage STS1 and the shared connection point of the third, fourth and tenth connecting elements 3, 4, 10.

FIG. 10 shows one of the ten possible arrangement variants for the clutches K1, K4, according to which each of the five arrangement variants for the clutch K1 may be combined with the two arrangement variants for the clutch K4.

Thus, FIG. 10 shows operatively equivalent transmission variants or gear patterns of the arrangement variants for the clutches K1, K4. As in the case of the first and the second main systems having all planetary gear sets on the input drive shaft AN, shown in FIGS. 2 and 3 through 8, a whole range of transmission variants is also possible in the case of the variants of the third main system having one gear set on the output shaft AB. These are largely identical and always operatively equivalent to the transmission variants of the first main system. Because of the repositioning, however, there is an additional arrangement variant for the clutch K1. Here too, as in the case of the first main system, arrangements for the clutches K1 K4 are possible without altering the function of the transmission 120. These arrangement options are depicted in FIG. 10.

Thus, for the clutch K1 there are four additional arrangement options A5, A6, A7, A8. For the clutch K4, there is one additional arrangement option A9.

FIG. 11 shows a gear pattern of the multi-stage transmission 120 as a second main system according to another exemplary embodiment of the present invention. In this arrangement, the first planetary gear stage PS1 is disposed on the output shaft AB.

The arrangement of the second and the third planetary gear set has been varied as compared to the exemplary embodiment shown in FIGS. 9 and 10. All of the transmission elements, connecting elements, shafts, torsion-resistant connections, shift elements and arrangement variants are identical to the exemplary embodiment shown in FIGS. 9 and 10. As previously shown in FIGS. 6 through 8, the spatial arrangement, in particular of the first, fourth and ninth connecting element 1, 4, 9, as well as of the second and the fifth shift element K2, B1 has been modified, as compared to the exemplary embodiment shown in FIG. 9. In this case, the precise geometric position of the transmission elements (clutches, gear sets, spur gears, etc.) is flexible in all variants, thus, individual planetary gear sets, spur gears or clutches may also be interchanged or relocated, connectability permitting.

Figure 12:
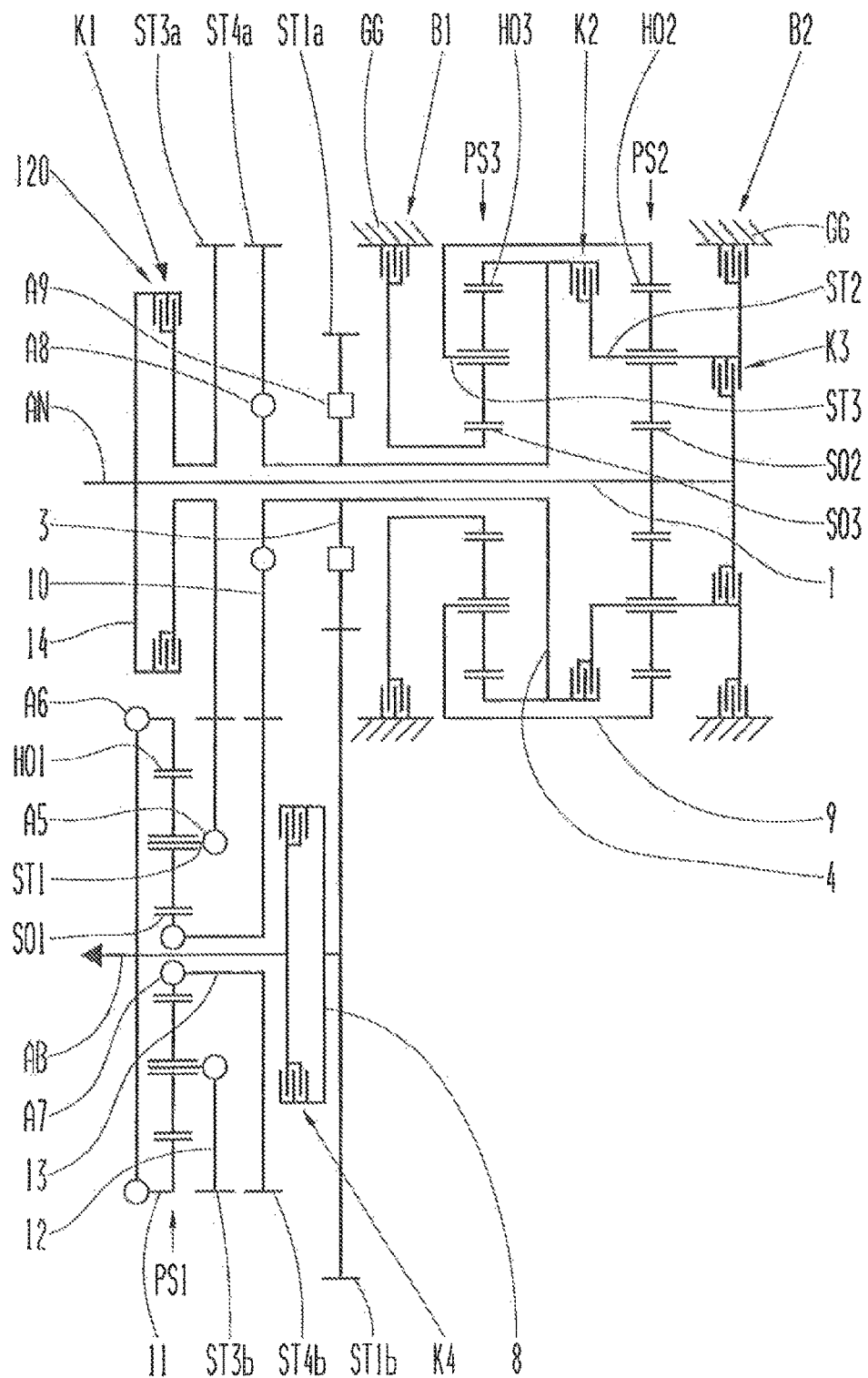
FIG. 12 shows blocking variants of the exemplary embodiment shown in FIG. 11 according to one exemplary embodiment of the present invention.

FIG. 12 shows blocking variants of the exemplary embodiment shown in FIG. 11 according to one exemplary embodiment of the present invention. The gear pattern depicted in FIG. 12 corresponds to the gear pattern of a multi-stage transmission 120 depicted in FIG. 11, from which multiple, operatively equivalent transmission variants may be derived, wherein for the first shift element K1, or the clutch K1, there are four additional operatively equivalent arrangement variations, and another arrangement variant is possible for the fourth shift element K4, or the clutch K4. The four arrangement variants for the clutch K1 are designated in FIG. 10 as A5, A6, A7, A8, the arrangement variant for the clutch is designated as A9. The arrangement of the operatively equivalent blocking variants corresponds to the blocking variants shown in FIG. 10. Thus, the first shift element may be disposed as operatively equivalent to the arrangement variant shown for the first shift element in the fourteenth connecting element 14, with an arrangement variant designated as A5 in the twelfth connecting element 12, with an arrangement variant designated as A6 in the eleventh connecting element 11, with an arrangement variant designated as A7 in the thirteenth connecting element 13, and with an arrangement variant designated as A8 in the tenth connecting element 10. In addition to the exemplary embodiment shown in the eighth connecting element 8, the fourth shift element K4 may be disposed as the ninth arrangement variant A9 in the third connecting element 3.

Shown in FIGS. 13 and 14 is a hybridization of a multi-stage transmission according to the invention. An electric machine or other power source may in principle be disposed on each shaft of a multi-stage transmission according to one of the exemplary embodiments described.

FIG. 13 shows a schematic representation of a power-shiftable multi-stage transmission 120, implemented as a first main system, having a power source EM according to one exemplary embodiment of the present invention. According to this exemplary embodiment, the power source EM is implemented as an electric machine EM. This is a hybridization, therefore, with an electric machine EM, which is disposed directly on the input drive shaft AN of the multi-stage transmission 120 described with reference to FIG. 2 and implemented as the first main system.

The multi-stage transmission 120 known from FIG. 2 is augmented according to this exemplary embodiment by an electric machine EM and an additional clutch K0 on the input drive shaft AN. In the first shaft train WS1, the electric machine EM as a load source and the clutch K0 are disposed between an internal combustion engine powering the input drive shaft AN, as is shown, for example, in FIG. 1 and the electric machine EM. The clutch K0, the electric machine EM, the two spur gear stages STS1, STS2 and the three planetary gear sets PS1, PS2, PS3 are disposed coaxially one behind the other in the axial direction in the sequence "K0, EM, PS1/STS2, STS1, PS2, PS3". The electric machine acts directly on the input drive shaft. The hybridization is possible with all the exemplary embodiments described and shown in FIGS. 1 through 12. The linking of the electric machine EM to the input drive shaft AN represents an exemplary embodiment variant; in principal, an electric machine or other energy source or power source may be disposed on each shaft of a planetary power shift transmission according to the invention.

If, as is shown in FIG. 13, the additional clutch K0, in addition to the electric machine EM, is placed between an internal combustion engine, as is shown for example, in FIG. 1, and the electric machine EM, then it is possible for all gears, as they are described, for example, with reference to FIG. 3, to operate fully electrically, both forwards and in reverse. For this purpose, the internal combustion engine is decoupled by the disengaged clutch K0.

Beside the hybridization including an electric machine EM directly on the input drive shaft AN, a hybridization including an electric machine EM axially parallel to the input drive shaft AN is also contemplated, as is described with reference to FIG. 14.

FIG. 14 shows a schematic representation of a power shiftable multi-stage transmission 120 having an output source EM according to one exemplary embodiment of the present invention. The output source EM is implemented as an electric machine EM, similar to the exemplary embodiment described with reference to FIG. 13. Thus, a hybridization is involved which has an electric machine EM disposed axially parallel to the input drive shaft AN of the exemplary embodiment of a multi-stage transmission 120 described with reference to FIG. 2.

Unlike the exemplary embodiment shown in FIG. 13, the electric machine EM in this exemplary embodiment is not directly torsion-resistantly connected to the first connecting element, but is coupled rather via a fifth spur gear state STS5 to the first connecting element. The electric machine EM is disposed axially parallel to the shaft trains on the side of the first shaft train WS1 opposite the second shaft train WS2. The arrangement of the planetary gear set PS1, PS2, PS3 and the spur gear stages STS1, STS21, as well as the connection or blocking between them, corresponds to the exemplary embodiment of the present invention shown in FIG. 2.

The arrangement of the gear sets and clutches described above allow a multi-stage transmission according to the described concept to also be used as a front transverse system. In this arrangement, the multi-stage transmission manages with a smaller number planetary sets.

The exemplary embodiments described and shown in the figures are selected merely as examples. Different exemplary embodiments may be combined with one another in full or with respect to individual features. In addition, an exemplary embodiment may be supplemented by features of another exemplary embodiment.

If an exemplary embodiment has an "and/or" link between a first feature and a second feature, this is to be read in the sense that the exemplary embodiment according to one specific embodiment has both the first feature as well as the second feature, and according to another specific embodiment, either just the first feature or just the second feature. In addition to the embodiments described by way of example and exemplary embodiments, there are additional spatial arrangements of the planetary sets and the shift elements per se and relative to one another, which do not affect the function of the transmission described.

In particular, the same gear pattern may result in different gear increments for all of the exemplary embodiments of the transmission family depicted and described, depending on the stationary gear ratio of the individual planetary sets, thereby making an application-specific or vehicle-specific variation possible. It is also possible to provide additional free wheels at each suitable location of the multi-stage transmission, for example, between a shaft and the housing or on the output shaft or, optionally, to connect around two shafts. According to the invention, an axle differential and/or a distributor differential may be disposed on the side of the input drive shaft or on the side of the output shaft. The multi-stage transmission may be appropriately advantageously refined, for example, by arranging a torsion vibration damper between the drive motor and the transmission. In addition, the input drive shaft AN may, when necessary, be separated from a drive motor by a clutch element, the clutch element used being a hydrodynamic converter, a hydrodynamic clutch, a dry start-up clutch, a wet start-up clutch, a magnet powder clutch or a centrifugal clutch. It is also possible to arrange such a start-up element in the power flow direction downstream from the transmission, in this case the input drive shaft AN always being connected to the crankshaft of the drive motor.

Beside the hybridization of a multi-stage transmission according to the invention, a wear-free brake, such as a hydraulic or electric retarder, may be disposed on each shaft, preferably on the input drive shaft AN or the output shaft AB in an embodiment of the invention not further depicted, which is of particular importance for its use in commercial vehicles. In addition, an auxiliary drive may be provided for driving additional assemblies on each shaft, preferably on the input drive shaft AN or the output shaft AB.

REFERENCE CHARACTERS 100 vehicle
110 engine
120 planetary power shift transmission
AN input drive shaft
AB output shaft
WS1 first shaft train
WS2 second shaft train
K1 shift element, clutch
K2 shift element, clutch
K3 shift element, clutch
K4 shift element, clutch
B1 shift element, brake
B2 shift element, brake
PS1 first planetary gear set
PS2 second planetary gear set
PS3 third planetary gear set
SO1 sun gear
SO2 sun gear
SO3 sun gear
HO1 ring gear
HO2 ring gear
HO3 ring gear
ST1 carrier
ST2 carrier
ST3 carrier
STS1 first spur gear stage
STS2 second spur gear stage
STS3 third spur gear stage
ST1$a$ first spur gear
ST1$b$ second spur gear
ST2$a$ first spur gear
ST2$b$ second spur gear
ST3$a$ first spur gear
ST3$b$ second spur gear
ST4$a$ first spur gear
ST4$b$ second spur gear
1 first connecting element
2 second connecting element
3 third connecting element
4 fourth connecting element
5 fifth connecting element
6 sixth connecting element
7 seventh connecting element
8 eighth connecting element
9 ninth connecting element
10 tenth connecting element
11 eleventh connecting element
12 twelfth connecting element
13 thirteenth connecting element
GG transmission housing
EM power source

The invention claimed is:
1. A power shiftable multi-stage transmission (120), of a planetary design, being disposed between an input drive shaft (AN) and an output shaft (AB) for a vehicle (100), the multi-stage transmission comprising:

two parallel shaft trains (WS1, WS2),
first, second, third, fourth, fifth and sixth shift elements (K1, K2, K3, K4, B1, B2), wherein the first, the second, the third, and the fourth shift elements (K1, K2, K3, K4) are clutches and the fifth and the sixth shift elements are brakes (B1,B2),
at least first and second spur gear stages (STS1, STS2),
first, second and third planetary gear sets (PS1, PS2, PS3), and each of the first, the second and the third planetary gear sets (PS1, PS2, PS3) comprising a sun gear (SO1, SO2, SO3), a ring gear (HO1, HO2, HO3) and a planet carrier (ST1, ST2, ST3) having multiple planetary gears,
the two shaft trains (WS1, WS2) being connectable with one another via the at least first and the second spur gear stages (STS1, STS2), and
different transmission ratios, between the input drive shaft (AN) and the output shaft (AB), being achieved by selective engagement of at least three of the first, the second, the third, the fourth, the fifth and the sixth shift elements (K1, K2, K3, K4, B1, B2) such that at least nine forward gears and at least one reverse gear can be implemented.

2. The power shiftable multi-stage transmission (120) according to claim 1, wherein
the first, the second and the third planetary gear sets (PS1, PS2, PS3) and the input drive shaft (AN) are disposed on a first shaft train (WS1) of the two parallel shaft trains (WS1, WS2),
the output shaft (AB) is disposed on a second shaft train (WS2) of the two parallel shaft trains (WS1, WS2),
the two parallel shaft trains (WS1, WS2) are connectable to one another via at least the first and the second spur gear stages (STS1, STS2),
the sun gear (SO2) of the second planetary gear set (PS2) of the three planetary gear sets (PS1, PS2, PS3) and the input drive shaft (AN) are connected or connectable with one another in a rotationally fixed manner and form a first connecting element (1),
the sun gear (SO1) of the first planetary gear set (PS1) of the three planetary gear sets (PS1, PS2, PS3), a first spur gear (ST1a) of the first spur gear stage (STS1) of at least the first and the second spur gear stages (STS1, STS2) and the ring gear (HO3) of the third planetary gear set (PS3) of the three planetary gear sets (PS1, PS2, PS3) are connected or connectable to one another, via second, third and fourth connecting elements (2, 3, 4), the second, the third and the fourth connecting elements (2, 3, 4) have a shared connection point, and the second connecting element (2) is also connected to the sun gear (SO1) of the first planetary gear set (PS1), the third connecting element (3) is also connected to the first spur gear (ST1a) of the first spur gear stage (STS1) and the fourth connecting element (4) is also connected to the ring gear (HO3) of the third planetary gear set (PS3),
a first spur gear (ST2a) of the second spur gear stage (STS2) of at least the first and the second spur gear stages (STS1, STS2) and the ring gear (HO1) of the first planetary gear set (PS1) are connected or connectable with one another and form a fifth connecting element (5),
a second spur gear (ST2b) of the second spur gear stage (STS2) and the output shaft (AB) are connected or connectable with one another and form a sixth connecting element (6),
the carrier (ST1) of the first planetary gear set (PS1) and the input drive shaft (AN) are connected or connectable with one another and form a seventh connecting element (7),
a second spur gear (ST1b) of the first spur gear stage (STS1) and the output shaft (AB) are connected or connectable with one another and form an eighth connecting element (8),
the ring gear (HO2) of the second planetary gear set (PS2) and a carrier (ST3) of the third planetary gear set (PS3) are connected or connectable with one another and form a ninth connecting element (9),
the second shift element (K2) is disposed in a flow of power between the fourth connecting element (4) and the carrier (ST2) of the second planetary gear set (PS2),
the fifth shift element (B1) is disposed in the flow of power between the sun gear (SO3) of the third planetary gear set (PS3) and a transmission housing (GG), and
a sixth shift element (B2) is disposed in the flow of power between the carrier (ST2) of the second planetary gear set (PS2) and the transmission housing (GG).

3. The power shiftable multi-stage transmission (120) according to claim 2, wherein the seventh connecting element (7) supports a first portion of the first shift element (K1), and, when the first shift element (K1) is engaged, the input drive shaft (AN) is connected to the carrier (ST1) of the first planetary gear set (PS1).

4. The power shiftable multi-stage transmission (120) according to claim 2, wherein one of:
the second connecting element (2) supports a first portion of the second shift element (K2), or
the fifth connecting element (5) is connected to a second portion of the first shift element (K1).

5. The power shiftable multi-stage transmission (120) according to claim 2, wherein the sixth connecting element (6) is connected to the fifth connecting element (5), and the first shift element (K1) is disposed to supply power to the second spur gear (ST1b) of the first spur gear stage (STS1) and the output shaft (AB).

6. The power shiftable multi-stage transmission (120) according to claim 2, wherein one of:
the third shift element (K3) is disposed in the flow of power between the input drive shaft (AN) and the carrier (ST2) of the second planetary gear set (PS2), or
the third shift element (K3) is disposed in the flow of power between the carrier (ST2) of the second planetary gear set (PS2) and the ninth connecting element (9).

7. The power shiftable multi-stage transmission (120) according to claim 2, wherein the fourth shift element (K4) is disposed in the flow of power between the shared connection point of the third, the fourth and the tenth connecting elements (3, 4, 10) and the output shaft (AB).

8. The power shiftable multi-stage transmission (120) according to claim 1, wherein two planetary gear sets (PS2, PS3) of the first, the second and the third planetary gear sets and the input drive shaft (AN) are disposed on a first shaft train (WS1) of the two parallel shaft trains (WS1, WS2),
the first planetary gear set (PS1) of the three planetary gear sets (PS1, PS2, PS3) and the output shaft (AB) are disposed on a second shaft train (WS2) of the two parallel shaft trains (WS1, WS2),
the two parallel shaft trains (WS1, WS2) are connectable to one another via the first spur gear stage, the second spur gear stage and a third spur gear stage (ST2, ST3, ST4), the sun gear (SO2) of the second planetary gear set (PS2) of the three planetary gear sets (PS1, PS2, PS3) and the input drive shaft (AN) are connected in a rotationally fixed manner to one another and form a first connecting element (1), the ring gear (HO3) of the third planetary gear set (PS3), a first spur gear (ST3a) of the third spur gear stage (STS3) and a first spur gear (ST1a) of the first spur gear stage (STS1) of the first, the second and the third spur gear stages (STS2, STS3, STS4) are connected or connectable via third, fourth and tenth connecting elements (3, 4, 10), the third, the fourth and the tenth connecting elements (3, 4, 10) have a shared connection point, and the third connecting element (3) is also connected or connectable to the first spur gear (ST1a) of the first spur gear stage (STS1), the fourth connecting element (4) is also connected to the ring gear (HO3) of the third planetary gear set (PS3), and the tenth connecting element (10) is also connected to the first spur gear (ST3a) of the third spur gear stage (STS3), a second spur gear (ST1b) of the first spur gear stage (STS1) and the output shaft (AB) are connectable and form an eighth connecting element (8), the ring gear (HO2) of the second planetary gear set (PS2) of the three planetary gear sets (PS1, PS2, PS3) and the carrier (ST3) of the third planetary gear set (PS3) are connected or connectable, in a rotationally fixed manner, to one another and form a ninth connecting element (9), the output shaft (AB) and the ring gear (HO1) of the first planetary gear set (PS1) are connected or connectable and form an eleventh connecting element (11), the carrier (ST1) of the first planetary gear set (PS1) and a second spur gear (ST4b) of the second spur gear stage (STS4) are connected or connectable and form a twelfth connecting element (12), the sun gear (SO1) of the first planetary gear set (PS1) and a second spur gear (ST3b) of the third spur gear stage (STS3) are connected or connectable and form a thirteenth connecting element, a first spur gear (ST4a) of the second spur gear stage (STS4) and the input drive shaft (AN) are connectable with one another and form a fourteenth connecting element (14), the fourth connecting element (4) and the carrier (ST2) of the second planetary gear set (PS2) are connectable by the second shift element (K2), the carrier (ST2) of the second planetary gear set (PS2) is connectable to the sun gear (SO02) of the second planetary gear set (PS2) and the input drive shaft (AN) by the third shift element (K3), the fifth shift element (B1) is disposed in a flow of power between the sun gear (SO3) of the third planetary gear set (PS3) and a transmission housing (GG), and the sixth shift element (B2) is disposed in the flow of power between the carrier (ST2) of the second planetary gear set (PS2) and the transmission housing (GG).

9. The power shiftable multi-stage transmission (120) according to claim 8, wherein the fourteenth connecting element (14) supports a first portion the first shift element (K1), and the first shift element (K1) is disposed in the flow of power between the input drive shaft (AN) and the first spur gear (ST4a) of the second spur gear stage (STS4).

10. The power shiftable multi-stage transmission (120) according to claim 8, wherein one of:

the first spur gear (ST4a) of the second spur gear stage (STS4) is connected to a second portion of the first shift element (K1), or the output shaft (AB) is directly connected to the ring gear (HO1) of the first planetary gear set (PS1), or the output shaft (AB) is connected to the ring gear (HO1) of the first planetary gear set (PS1) by a further connecting element.

11. The power shiftable multi-stage transmission (120) according to claim 8, wherein one of:

the thirteenth connecting element (13) is directly connected to the tenth connecting element (10), or the thirteenth connecting element (13) is connected to the tenth connecting element (10) by a further connecting element.

12. The power shiftable multi-stage transmission (120) according to claim 8, wherein the eighth connecting element (8) supports a first portion of the fourth shift element (K4), and the fourth shift element (K4) is disposed in the flow of power between the second spur gear (ST1b) of the first spur gear stage (STS1) and the output shaft (AB).

13. The power shiftable multi-stage transmission (120) according to claim 1, wherein a power source (EM) is disposed on the input drive shaft (AN).

14. The power shiftable multi-stage transmission (120) according to claim 1, wherein at least one of the first, the second and the third planetary gear sets (PS1, PS2, PS3) is a minus planetary gear set.

15. The power shiftable multi-stage transmission (120) according to claim 1, wherein a first forward gear is implemented by engaging the second, the fourth and the fifth shift elements (K2, K4, B1), a second forward gear is implemented by engaging the second, the third and the fourth shift elements (K2, K3, K4), a third forward gear is implemented by engaging the third, the fourth and the fifth shift elements (K3, K4, B1), a fourth forward gear is implemented by engaging the first, the third, and the fourth shift elements (K1, K3, K4), a fifth forward gear is implemented by engaging the first, the third and the fifth shift elements (K1, K3, B1), a sixth forward gear is implemented by engaging the first, the second and the third shift elements (K1, K2, K3), a seventh forward gear is implemented by engaging the first, the second and the fifth shift elements (K1, K2, B1), an eighth forward gear is implemented by engaging the first, the second and the sixth shift elements (K1, K2, B2), a ninth forward gear is implemented by engaging the first, the fifth and the sixth shift elements (K1, B1, B2), and the reverse gear is implemented by engaging the fourth, the fifth and the sixth shift elements (K4, B1, B2).

16. A power shiftable multi-stage transmission of planetary design for a vehicle, the multi-stage transmission comprising:

an input drive shaft, an output shaft;

first and second parallel shaft trains;

first, second, third, fourth, fifth and sixth shift elements, wherein the first, second, third, and fourth shift elements are clutches and the fifth and sixth shift elements are brakes;

at least first and second spur gear stages;

first, second and third planetary gear sets, and each of the first, the second and the third planetary gear sets comprising a sun gear, a ring gear and a planet carrier which supports a plurality of planetary gears;

the first and the second shaft trains being connectable with one another via at least the first and the second spur gear stages;

at least three of the first, the second, the third, the fourth, the fifth, and the sixth shift elements being selectively engagable for implementing a plurality of different transmission ratios between the input drive shaft, and the output shaft such that at least nine forward gears and at least one reverse gear can be implemented.

17. The power shiftable multi-stage transmission according to claim 16, wherein the first, the second and the third planetary gear sets and the input drive shaft are disposed on the first shaft train and the output shaft is disposed on the second shaft train, and the first and the second shaft trains are connectable to one another via at least the first and the second spur gear stages;

the sun gear of the second planetary gear set is continuously connected to the input drive shaft and a first connecting element;

the sun gear of the first planetary gear set, a first spur gear of the first spur gear stage and the ring gear of the third planetary gear set are connected to one another via a second, a third and a fourth connecting element, the second, the third and the fourth connecting elements comprising a common connection point, and the second connecting element is connected to the sun gear of the first planetary gear set, the third connecting element is connected to the first spur gear of the first spur gear stage and the fourth connecting element is connected to the ring gear of the third planetary gear set;

a first spur gear of the second spur gear stage is connected to the ring gear of the first planetary gear set and forms a fifth connecting element;

a second spur gear of the second spur gear stage is connected to the output shaft and forms a sixth connecting element;

the carrier of the first planetary gear set is connectable to the input drive shaft and forms a seventh connecting element;

a second spur gear of the first spur gear stage is connected to the output shaft and forms an eighth connecting element;

the ring gear of the second planetary gear set is connected to the carrier of the third planetary gear set and forms a ninth connecting element;

the second shift element is arranged in a flow of power between the fourth connecting element and the carrier of the second planetary gear set;

the fifth shift element is arranged in the flow of power between the sun gear of the third planetary gear set and a transmission housing; and the sixth shift element is arranged in the flow of power between the carrier of the second planetary gear set (PS2) and the transmission housing.

18. The power shiftable multi-stage transmission (120) according to claim 16, wherein a first forward gear is implemented by engaging the second, the fourth and the fifth shift elements, a second forward gear is implemented by engaging the second, the third and the fourth shift elements, a third forward gear is implemented by engaging the third, the fourth and the fifth shift elements, a fourth forward gear is implemented by engaging the first, the third, and the fourth shift elements, a fifth forward gear is implemented by engaging the first, the third and the fifth shift elements, a sixth forward gear is implemented by engaging the first, the second and the third shift elements, a seventh forward gear is implemented by engaging the first, the second and the fifth shift elements, an eighth forward gear is implemented by engaging the first, the second and the sixth shift elements, a ninth forward gear is implemented by engaging the first, the fifth and the sixth shift elements, and the reverse gear is implemented by engaging the fourth, the fifth and the sixth shift elements.

* * * * *